United States Patent
Lee

(10) Patent No.: US 6,302,421 B1
(45) Date of Patent: Oct. 16, 2001

(54) VEHICLE WITH SWIVEL CONTROL OF CASTERS FOR ENABLING RIDER OR EXTERNAL STEERING

(76) Inventor: Aaron Lee, 232 Edwin Way, Hayward, CA (US) 94544-3517

( * ) Notice: Subject to any disclaimer, the term of this patent is extended or adjusted under 35 U.S.C. 154(b) by 0 days.

(21) Appl. No.: 09/571,077

(22) Filed: May 15, 2000

(51) Int. Cl.$^7$ ....................................................... B62B 9/10
(52) U.S. Cl. ..................... 280/210; 280/47.38; 280/214; 280/263
(58) Field of Search ................................. 280/210, 214, 280/828, 1.202, 87.043, 47.38, 47.4, 648, 650, 829, 200, 240, 259, 263, 267, 304.1, 1.188, 1.189, 269, 293, 89.12, 93.502, 93.51, 93.512; 16/18 R, 35 R

(56) References Cited

U.S. PATENT DOCUMENTS

| | | | |
|---|---|---|---|
| D. 356,760 | 3/1995 | Baechler | D12/129 |
| D. 356,761 | 3/1995 | Jacobs | D12/129 |
| D. 365,313 | 12/1995 | Mosetich | D12/129 |
| D. 380,180 | 6/1997 | Lo | D12/129 |
| D. 382,837 | 8/1997 | Haut | D12/129 |
| D. 385,514 | 10/1997 | Eyman | D12/129 |
| D. 388,367 | 12/1997 | Polak | D12/129 |
| 1,793,848 | * 2/1931 | Gill et al. . | |
| 3,423,086 | 1/1969 | Moore | 272/73 |
| 3,810,658 | 5/1974 | Weimer | 280/269 |
| 4,089,543 | * 5/1978 | Osborne | 280/647 |
| 4,152,005 | 5/1979 | Vanore | 280/234 |
| 4,241,932 | 12/1980 | Hartmann | 280/265 |
| 4,281,844 | 8/1981 | Jackman | 280/87.01 |
| 4,361,338 | 11/1982 | Kuchenbecker | 280/1.11 |

(List continued on next page.)

OTHER PUBLICATIONS

Friendly Wheels (scooter brochures), Spring 1999 issue, 16 pages, By Amigo Mobility, Inc. Bridgeport, MI.
Kool–Stride All Terrain Jogging Strollers (brochure), date prior to 1998, 8 pages, By Kool–Stop International, Inc. La Habra, CA.
My Burley Trailers & Trailercycles (brochure), 1998, 12 pages, By Burley Design Cooperative, Eugene, OR.
Kid–Kart (stroller for special needs), 1997 issue, 12 pages, By Sunrise Medical, Belgrade, Montana.*
EZ Chair (pedal type wheelchair), 2000, 2 pages, By Premier Designs, Fresno, CA.*
Get Your Own BISON (cart brochure), date prior to 1998, double sided poster, By Bison, Holland.*

(List continued on next page.)

*Primary Examiner*—Anne Marie Boehler
*Assistant Examiner*—Tony Winner
(74) *Attorney, Agent, or Firm*—David Pressman

(57) ABSTRACT

A vehicle with a caster (12) has a disconnectable steering system so the vehicle can be quickly and easily converted back and forth between rider-steerable and externally steerable configurations. The vehicle includes a frame (body) (20), the caster, and a steering mechanism (22, 24, 34) mounted on the frame. A disconnecting device (32) is mounted between the steering mechanism and the caster. When the disconnecting device connects the steering mechanism to the caster, the vehicle can be steered by the occupant since the steering mechanism and caster rotate as one unit. When the disconnecting device disconnects the steering mechanism from the caster, the caster is allowed to swivel freely (360°) about its vertical axis so that the vehicle can be pushed or pulled in any direction by an external operator. The vehicle may be a stroller, a toy vehicle, a scooter, a wheelchair, a cart, a dolly, etc., and it can have more than one caster.

23 Claims, 13 Drawing Sheets

U.S. PATENT DOCUMENTS

| | | | |
|---|---|---|---|
| 4,586,723 | | 5/1986 | Nabinger ................................ 280/242 |
| 4,714,261 | * | 12/1987 | Kassai .................................... 280/7.1 |
| 4,824,132 | * | 4/1989 | Moore ................................ 280/304.1 |
| 4,865,344 | * | 9/1989 | Romero ................................ 280/242 |
| 5,020,815 | * | 6/1991 | Harris .................................... 280/246 |
| 5,028,066 | * | 7/1991 | Garth .................................... 280/282 |
| 5,031,912 | * | 7/1991 | Vaughn ................................ 272/132 |
| 5,188,389 | * | 2/1993 | Baechler ............................... 280/650 |
| 5,267,744 | * | 12/1993 | Berry .................................... 280/204 |
| 5,280,937 | * | 1/1994 | Needham ............................. 280/259 |
| 5,421,597 | * | 6/1995 | Berner .................................. 280/204 |
| 5,468,009 | * | 11/1995 | Eyman .................................. 280/650 |
| 5,474,316 | * | 12/1995 | Britton ................................. 280/204 |
| 5,499,835 | * | 3/1996 | Skirchak, Jr. et al. .............. 280/293 |
| 5,531,494 | * | 7/1996 | Singleton .............................. 294/1.1 |
| 5,590,896 | * | 1/1997 | Eichorn ................................ 280/642 |
| 5,692,760 | * | 12/1997 | Pickering ............................. 280/7.17 |
| 5,695,212 | | 12/1997 | Hinkston .............................. 280/642 |
| 5,845,724 | | 12/1998 | Barrett ................................. 180/65.1 |
| 5,901,973 | | 5/1999 | Warren ................................ 280/260 |
| 5,924,713 | | 7/1999 | Li .......................................... 280/270 |
| 6,106,440 | * | 8/2000 | Olbrish, Jr. ............................ 482/57 |
| 6,250,652 | * | 6/2001 | Nelson .............................. 280/47.38 |

OTHER PUBLICATIONS

The Baby Jogger (jogging stroller brochure), date prior to 1998, 8 pages, By Baby Jogger Company, Yakima, WA.

Combi 1997 Classic catalog (stroller catalog), 14 pages, By Combi, Carol Stream, IL.

SPFII is the answer (wheelchair brochure), Aug. 1997, 2 pages, By Everst & Jennings, Earth City, MO.

Kettler Toys (pedal car brochure–copy), date prior to 1998, 2 pages, By Kettler, Germany.

Discovery (tricycle for special needs), date prior to 1998, 2 pages, By Freedom Concepts Inc., Manitoba, Canada.

Mitraco (three and four wheel pedal car–copy), date prior to 1998, 2 pages, Mitraco, Inc., Peekskill, NY.

* cited by examiner

VEHICLE WITH SWIVEL CONTROL OF CASTERS FOR ENABLING RIDER OR EXTERNAL STEERING

BACKGROUND—FIELD OF INVENTION

This invention relates to a vehicle with casters, particularly to a convertible swivel control for enabling the vehicle to be properly controlled, whether rider or externally steered.

BACKGROUND—PRIOR ART

Many vehicles are constructed with casters-rotatable wheels which can swivel-so that the vehicles can be rolled over a surface. The axle of the wheel is usually horizontal while the swivel axis is usually vertical. A caster can be attached to the underside or leg of any vehicle or rollable item, object, or device, such as a piece of furniture, a cart, a dolly, or other heavy object, to make it easier to move.

Casters are commonly employed as the front wheels in externally propelled rolling vehicles, such as strollers, wheelchairs, dollies, office chairs, etc., which are commonly pushed or pulled by someone or some source separate from the vehicle. Each caster typically includes one or more vertically oriented wheels rotatably held by a generally vertical fork, which is in turn attached to a generally upright swivel pintle, pin, or bolt. This vertical pintle is usually perpendicular to but offset horizontally from the wheel's horizontal axle. The pintle is journaled in bearings for rotation about a vertical axis within a fixed cylindrical vertical housing. When the vehicle is moved in any direction, the caster will swivel so that its wheel trails its pintle. This causes the wheel always to be oriented in the direction of motion of the vehicle so that it has high degree of maneuverability, regardless of the direction in which the vehicle is pushed or pulled.

While casters are very desirable in externally steered and propelled vehicles, such as noted above, they are a hindrance or a hazard in rider-steered vehicles, such as tricycles, pedal cars, bicycles, go-carts, etc. This is because a caster can be turned completely around (360°) and such a range is not needed in and may actually destabilize the vehicle. To ensure stability, a swivel wheel for a rider-propelled vehicle should not be turnable more than about 45° in either direction.

Thus the two types of vehicles, rider and externally steered, are considered separate and one type is rarely used in place of the other.

E.g., vehicles with casters, such as strollers, are used to transport infants and children. They are passive; i.e., they are pushed. The children are not challenged to participate in the propulsion or guidance of their vehicle. Tricycles and pedal cars become useful only after the child fully develops coordination skills and adequate size and strength to allow their feet to reach the pedals and propel the vehicle. Thus, existing vehicles are either propelled and guided by others while the child is compelled to remain a passive occupant, or are of the type which require full development of mental and physical capacities to become an active independent and unassisted driver. In most cases, the transition process from a passive occupant to an unassisted driver is abrupt and takes place with a minimum of training. The child, anxious to use the new rider-steerable toy, concentrates on making it go-an unsafe operation.

Thus such vehicles are of use for a limited time because children outgrow the passive vehicle at about 20 months of age. Then it becomes necessary to acquire a rider-steered vehicle, which puts a burden on families of limited means, and with limited storage space, to purchase and accommodate the multiple vehicles. This need, however, has been addressed to some degree by attempts to devise combination vehicles, but none have been commercially successful due to their complexity.

Strollers: Strollers in general are very well known, and provide a valuable mode of transportation. With swiveling front caster wheels, they provide high maneuverability in such places as shopping malls. Bigger children also ride strollers but soon get tired and also get bored quickly by just sitting.

U.S. Pat. No. D 365,313 to Mosetich et al. (1995) shows a toddler stroller but it is not steerable. U.S. Pat. No. D 388,367 to Polak et al. (1997) shows a sport vehicle stroller; however it has a steering wheel that doesn't work. U.S. Pat. No. D 382,837 to Haut et. al. (1997) shows an all-terrain stroller with swivel wheels. This is a typical baby stroller that can't be steered by the child. U.S. Pat. No. 5,692,760 to Pickering (1997) shows a child transport device, but it doesn't have casters and hence is difficult to maneuver.

Jogging Strollers: Jogging strollers have become a very popular product for sport-minded adults with children. They can be used while the adult walks or runs. However they can't be steered by the child and the child gets no exercise while the adult runs.

U.S. Pat. No. 5,188,389 to Baechler (1993) shows a foldable baby stroller and axle assembly. The drawback to this design is the absence of a directionally pivoting front wheel, which makes the simple task of turning the stroller an arduous one. A non-pivoting front wheel makes steering cumbersome and difficult. Thus the operator must push down on the handle bar to raise the front wheel off the ground in order to steer.

U.S. Pat. No. D 385,514 to Eyrman et al. (1997) shows a folding stroller with a front caster; the stroller can't be propelled by the child-rider.

U.S. Pat. No. D 356,760 to Brechter (1995) shows a baby stroller frame, which again can't be propelled by the rider.

U.S. Pat. No. 5,695,212 to Hinkston (1997) shows a collapsible baby jogging stroller with casters. This stroller can't be steered by the child and the child gets no exercise while the adult runs.

U.S. Pat. No. 5,468,009 to Eyrnan et al. (1995) and U.S. Pat. No. 5,590,896 to Eichhom (1997) show collapsible folding strollers, which, having casters, cannot be propelled by the rider.

Bicycle Trailers: Trailers for use with bicycles are well known and are useful for carrying small children or for transporting goods. On some of the trailers a stroller wheel assembly is mounted on a bicycle trailer tongue to permit operation as either a trailer or a separate three-wheel stroller. There are many types trailers available, but children get no exercise while the propelling adults do. Typical devices are shown in U.S. Pat. No. 5,421,597 to Bemer (1995) (convertible infant stroller and trailer with quick-release hitch), U.S. Pat. No. 5,267,744 to Berry et al. (1993) (stroller wheel assembly for bicycle trailer), U.S. Pat. No. D 356,761 to Jacobs et al. (1995) (combination stroller and trailer for infants and children), and U.S. Pat. No. 5,474,316 to Britton (1995) (folding trailer).

Runabouts: In a runabout, a steering wheel turns and the rider must use their feet to control direction and propulsion. The feet can get caught under vehicle. Thus these devices are difficult to use and do not provide children with much fun.

Tricycles: For the very young and very old cyclists, and for people, who have insufficient strength or balance to maneuver a bicycle, the tricycle provides a stable and safer mode of transportation. However it can be dangerous to allow a child to ride alone on the street without adult supervision. U.S. Pat. No. 5,028,066 to Garth (1991) and U.S. Pat. No. 5,924,713 to Li (1999) provide guiding systems, but do not enable the tricycle to be maneuverable easily since they don't have casters. If one is pushed from the back without the rider holding onto the steering bar, the front wheel will flip to one side and will skid. Thus a tricycle can be pulled only. U.S. Pat. No. 4,152,005 to Vanore (1979) discloses a tricycle for a handicapped individual, which is adjustable to an optimum position for almost any user. However its front wheel is not a caster and thus cannot be propelled and steered by someone who is not riding it.

Children's Pedal Cars And Ride-On Toys: Steerable cars are desired by children, but are not practical to own due to their large turning radii and the relatively small area of most back yards. It is dangerous to ride them in streets. Examples are shown in U.S. Pat. No. 4,361,338 to Kuchenbecker et al. (1982) (toy car with pedal drive), U.S. Pat. No. 5,901,973 to Warren (1999) (control system for pedal-driven vehicles), U.S. Pat. No. 4,281,844 to Jackman (1981) (steerable castered vehicle), U.S. Pat. No. 4,714,261 to Kassai (1987) (steering wheel fixing construction for toy vehicles), and U.S. Pat. No. 5,845,724 to Barrett (1998) (children's ride-on vehicle with an auxiliary control mechanism) show similar vehicles.

Scooters: There is a rapidly growing market for personal motor carts for use both indoors and outdoors. Frequently such scooters have been used by people who have been permanently or temporarily incapacitated in a way that makes walking difficult or impossible. Such scooters are shown in Pat. No. D 380,180 to Lo (1997). However these vehicles cannot be easily pushed due to the absence of casters. Their front wheels have limited swivel range.

Wheelchairs: At present, most wheelchairs are constructed with large rear wheels mounted in parallel, spaced to support a frame and a seat, and a pair of smaller, front wheels or casters which also support the frame. The rear wheels are equipped with large, circular driving handwheels, by means of which the wheelchair occupant manually propels the chair. The front wheels are typically mounted independently of each other. They are typically steered by the occupant by the handwheels on the rear wheels. When the occupant wishes to turn to the right, a greater forward driving force is exerted on the driving handwheel of the left rear wheel. For a sharp right turn a rearward driving force may be exerted on the handwheel of the right rear wheel while a forward driving force is exerted on the handwheel of the left rear wheel. To execute a left turn, the foregoing forces are reversed.

With front casters independently attached to the frame the occupant has enhanced maneuverability and can execute extremely sharp turns. The front casters can be turned and twisted independently of each other, and are not always parallel.

While conventional wheelchairs constructed as described are designed to maximize maneuverability and mobility for disabled persons, the very features that provide a high degree of maneuverability create considerable problems when wheelchairs are used for special purposes. Specifically, in recent years disabled persons have gained increasing interest in physical activities in which wheelchairs are propelled at higher speeds.

When conventional wheelchairs are operated at higher speeds, their casters tend to vibrate, shimmy, and become unstable. This becomes particularly dangerous during turning maneuvers, even if the turning radius is quite large. Since the front wheels are mounted independently, it is possible for one of the casters to twist sharply relative to the other. When this occurs, the wheelchair can turn over, and the occupant can be thrown to the ground.

The occupant must combat the vibration and shimmying of the front wheels with intense concentration to ensure that driving power is applied equally to the driving handwheels. Also, the vibration and shimmying of the front wheels creates a finite drag on forward progress, which must be overcome with additional driving force. As a result, the occupant is thereby unnecessarily slowed and fatigued when operating a wheelchair at higher speeds.

On a single-wheel steering system with two front wheels, in the event one of the casters strikes an obstruction, such as a stone or a curb, the caster will be easily, sometimes forcefully turned to one side and quickly turned away from the intended path of travel. Also the chair cannot be steered if the steered wheel is over a pothole or otherwise loses contact with the ground. This can create a potentially dangerous situation. These are useful only on smooth surfaces at slow speeds.

Such chairs are shown in U.S. Pat. No. 4,241,932 to Hartmann (1980-wheelchair steering apparatus), U.S. Pat. No. 4,586,723 to Nabinger (1986-steering device for a wheelchair), U.S. Pat. No. 4,865,344 to Romero (1989-wheelchair hand propulsion apparatus), U.S. Pat. No. 5,020,815 to Harris et al. (1991-rider-propelled, steerable wheelchair).

U.S. Pat. No. 3,810,658 to Weimer (1974) shows a wheelchair steering apparatus where both front wheels are steered. Its components must be disassembled in order to have the front casters swivel independently.

One wheelchair, sold under the trademark EZ CHAIR by Premier Design of Fresno, Calif., has a pair of front casters. The left caster is connected to a tiller that can be steered by the occupant. The tiller contains a vertical arm that extends down from the tiller handle; the arm can be pulled up to disengage the tiller from the caster so that the chair can be folded. This chair lacks directional stability due to its asymmetrical controllable caster, so that it can be used only on smooth surfaces at a relatively low speed.

Exercising Devices For Use With Wheelchairs: Various types of therapeutic exercise devices have been provided for children and adults who have different degrees of disabilities, as well as for providing healthful exercise. One is shown in U.S. Pat. No. 5,031,912 to Vaughan et al. (1991-therapy steering wheel for wheelchair). However this device does not provide any exercise to the patients' lower limbs. It has been recognized that many patients who utilize wheelchairs are not totally incapacitated in their lower limbs. For all patients in wheelchairs it is necessary to exercise the cardiovascular system, and to the extent the limbs are usable, to exercise those limbs as well.

Numerous devices have been proposed for attachment to the frame of a wheelchair to enable the user exercise in the wheelchair. See, e.g., U.S. Pat. Nos. 3,423,086 (1969) and 4,824,132 (1989) to Moore. Some devices provide propulsion as well as exercise, but they are not also usable in a simple and easy manner to propel the wheelchair. Another problem is the long time required for assembly, and oftentimes militates against the use of the device.

While increased exercise will provide many benefits (see below), most wheelchairs do not provide any easy way for their users to exercise.

Objects and Advantages

Accordingly, several objects and advantages of the invention are:

to overcome the above described disadvantages of conventional vehicles;

to provide an improved vehicle and caster for a vehicle;

to provide a vehicle combining the advantages of a externally propelled vehicle with casters, such as a conventional stroller, and a vehicle without casters, such as a pedal car;

to provide a vehicle for which a child-operator can efficiently steer and propel themselves;

to provide a vehicle which can be pushed while walking behind the vehicle, as with a stroller, to guide and control the direction of travel, while allowing the occupant child to participate in the propulsion and guidance process;

to provide a vehicle which will allow a child to gradually become a participant in the propulsion and guidance process to enhance development of mental and physical skills;

to provide a vehicle for people with limited mobility who wish to travel further than their canes or walkers allow, thereby to add a new dimension to their daily lives;

to add rider-steering capability to stroller, wheelchair, and child's vehicle;

to provide a stroller that has a steering wheel or bar for steering control by hand, and a pedal mechanism for driving (propelling) by foot;

to provide a vehicle particularly adapted for use by children and patients whom needs exercise; and to provide a vehicle which had good directional stability and can be used on rough surfaces and propelled at a relatively high speed.

Other objects and advantages are:

to provide such a vehicle in which the efficiency of the vehicle is maximized so as to make best use of the strength of the operator;

to provide a steerable vehicle that is fun to operate but that avoids the disadvantages and deficiencies of other vehicles;

to provide an improved vehicle with a short turning radius;

to provide a vehicle with which children can play, and which can be utilized for shopping;

to provide a vehicle with means to disconnect steering control when an adult pushing the vehicle needs to control the vehicle, as in a shopping mall, store, or when jogging;

to provide a novel vehicle which a child can propel only as long as the child wants to do so, and which then allows the supervising person to continue propelling the vehicle, thereby eliminating the need carry both the child and the vehicle;

to provide a vehicle in which children can learn about safety and operation to develop driving skills;

to provide a vehicle with a caster assembly which can be disconnected from the steering mechanism so that its wheels can be freely swiveled;

to provide a wheelchair which can translate leg movement into forward motion, thereby to exercise the occupant, e.g., for arthritic and cardiac patients;

to provide a wheelchair which alleviates the problem of front wheel instability when the wheelchair is operated at high speeds;

to provide a vehicle which can be advantageously used to provide exercise to speed rehabilitation;

to provide an alternative method of travelling for those who have insufficient balance for bicycling; and to provide a vehicle which a child can safely ride in a larger range of areas and not just in enclosed or protected areas.

Yet other objects and advantages of the invention will become apparent from the ensuing descriptions and accompanying drawings.

DRAWINGS

FIG. 1O is an exploded view of the caster of FIGS. 1M and 1N.

REFERENCE NUMERALS

Figure 1A:
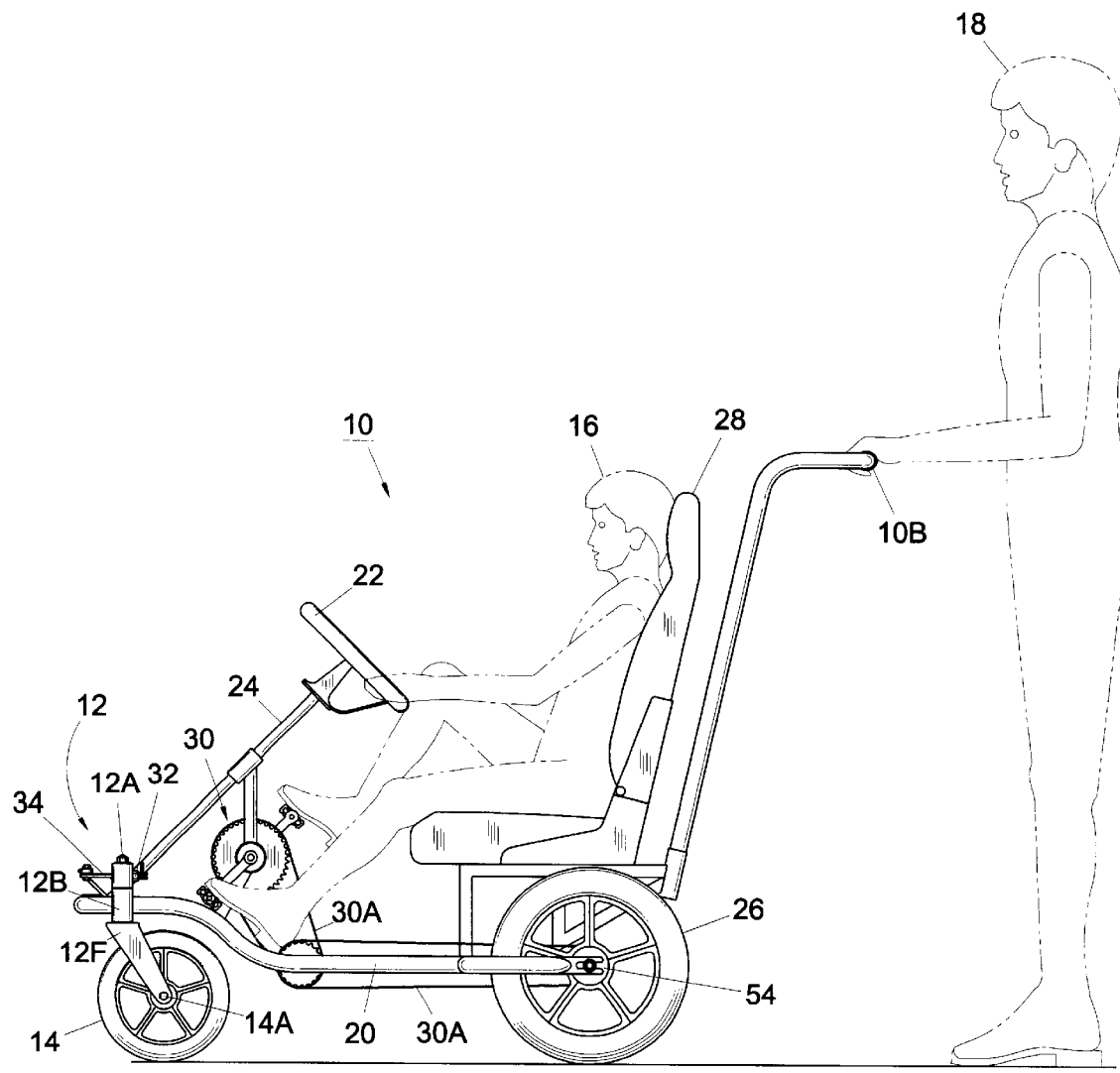
FIG. 1A is a side view of a pushable and steerable-pedalable child's vehicle according to the invention.

10 stroller
10B push bar
12 caster
12A pintle
12B pintle housing
12D mating recess
12F fork
14 wheel
14A axle
14C straight ahead position 14D freewheeling position
16 child
18 parent or caregiver
20 frame
22 steering wheel
24 steering shaft
26 rear wheel
28 seat
30 pedal assembly
30A chain
32 locking pin
32C pin inserted
32D pin pulled out
34 steering arm
36 radius arm
38 tie rod
40 steering shaft release pin
42 bucket seat
44 handlebar
46 release lever
48 cable
50 wheelchair
52 occupant
54 freewheel mechanism
56 tiller
58 tiller handle
60 steering stop
62 coupling
64 swivel lock
66 mating recess

SUMMARY

According to the invention, a vehicle apparatus has at least one caster mounted on the frame of the vehicle for rotational movement about a vertical axis. The caster is controlled by a steering mechanism for directional steering of the caster. A disconnecting means is provided to disconnect casters from steering mechanism so as to have the casters turn freely as the vehicle get pushed or powered. The steering assembly is disconnectable and has two operating positions:

(a) a "disconnected" or pushable/stroller position in which a locking pin or like device disconnects the steering mechanism and caster assembly so that the caster can swivel freely when a caregiver pushes or pulls it, and (b) a "connected" or rider-steerable position in which the locking pin or like device connects the steering mechanism and caster assembly, so that the caster is steerable within a limited range of swivel by the steering wheel or bar device operated by the occupant.

Definitions

In this patent, the following definitions are applicable:

Axle: The pivot shaft, usually horizontal, of the wheel of a caster.

Fork: The arms which extend down from a pintle and which lie on the respective sides of a wheel and which support its axle.

Pintle: The pivot shaft, usually vertical, on which a caster swivels.

Rotation: The turning of a wheel (usually vertical) on its own pivot shaft or axle (usually horizontal).

Swivel: The pivoting motion of a rotatable wheel (usually horizontal) about an axis or pintle (usually vertical), which is perpendicular to the axle on which the wheel rotates.

Swivel Wheel v. Caster: A swivel wheel is a wheel assembly that can rotate on its own axle, usually horizontal, and has a substantially lesser swivel range than 360°. A caster is a swivel wheel that can swivel substantially 360°, i.e., it has a substantially greater swivel range than a swivel wheel.

FIG. 1A-Description

FIG. 1A is a side view of a pushable and rider-steerable child's vehicle or stroller 10 according to the invention. It includes two disconnectable casters 12 according to the invention, only one of which is shown. Each caster includes a front wheel 14. The inventive caster may be used on any similar wheeled traveling vehicle, such as a wheelchair, scooter, toy vehicle, dolly, cart, etc. The frame (body) of the stroller is not a main part of the invention, which is directed to the details of front part of stroller. However in addition to the front part or section, the vehicle has a rear section with a rear end, and a center section with left and right sides extending between the front and rear sections.

A child 16 is seated in the stroller, which is also being held at its rear push bar 10B by a parent or caregiver 18. The stroller has a frame 20, a steering wheel 22 having a shaft 24, a set of two rear wheels 26 (non-steerable), and a seat assembly 28 mounted on frame 20. It has a pedal assembly 30 that is being operated by child 16. A set of chains 30A connects the pedal wheel to the rear wheel in conventional fashion. E.g., the connection can be through a known freewheel mechanism 54 on the rear wheel hub to allow the wheel to be turned forward without coupling this motion to the cranks. Other types of such connections are derailleur gearing, hub gearing, and coaster brakes. Also motorized power can be used in place of the pedal assembly. The child is also holding steering wheel 22.

In accordance with the invention, the stroller has the following two modes of operation: rider-controllable and externally controllable:

Rider-Controllable Mode: In the rider-controllable mode, caster 12 is connected to steering arm 34 and the swivel of its wheel 14 is limited to a range of about 90° (45° to the left and 45° to the right). In this mode the stroller can be controllably rider-steered and controlled by child 16. Note that an axle 14A (horizontal axis) of wheel 14 is behind a pintle 12A (vertical axis) of the caster. Pintle 12A can swivel in a pintle housing 12B that is connected to axle 14A by a slanted fork 12F which straddles wheel 14.

Externally Controllable Mode: The stroller can be converted from its rider-controllable mode to an externally controllable mode by disconnecting (pulling out) a pair of locking pins 32, only one of which is shown. Locking pins 32 disconnect steering arm 34 from the caster. When the stroller is so converted, caster 12 is disconnected from steering arm 34, steering shaft 24, and steering wheel 22, and is free to swivel 360° about pintle 12A on a vertical axis. This enables the stroller to be pushed or pulled in any direction. Since the axle of wheel 14 is behind the caster's vertical pintle 14A, the stroller can easily be pushed forward by parent 18. If the stroller is pulled backward by parent 18, wheel 14 will easily flip or swivel around 180° to a forward position (not shown) in which axle 14A of wheel 14 will be in front of the caster's vertical pintle, so that the stroller can easily be pulled backward.

One suitable locking pin comprises a known pull-ring retractable plunger or spring-loaded insertion pin (sold under the trademark VLIER) that can be held in a non-inserted position by pulling out the ring and rotating it 90°. It can be inserted by turning the ring 90° and allowing the spring to pull it in.

Figure 1B:
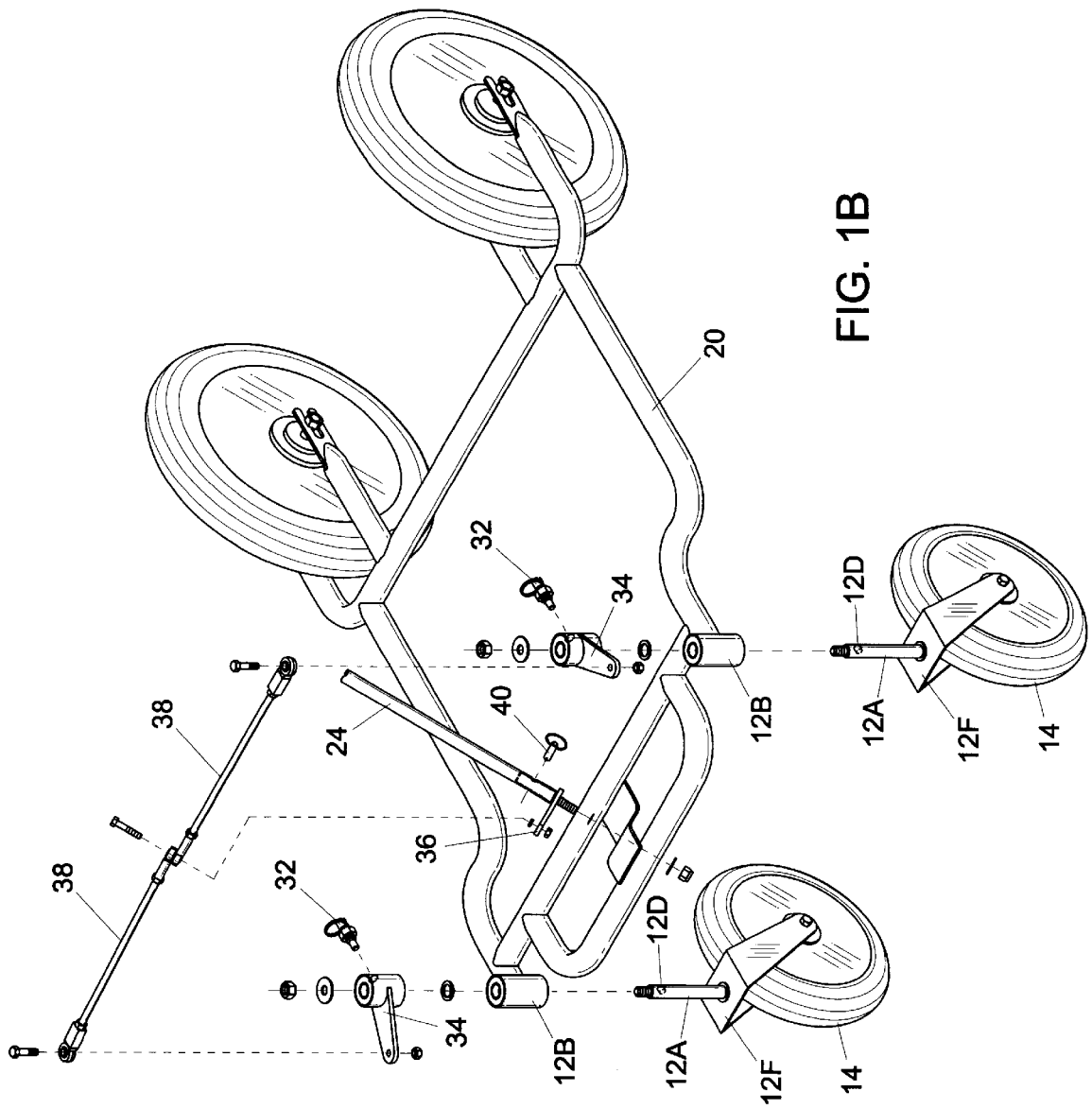
FIG. 1B is an exploded view of the vehicle of FIG. 1A.

FIG. 1B-Steering And Casters

As shown in FIG. 1B, an exploded view of the frame and wheels and steering mechanism, the upper end of each fork 12F is attached to a pintle 12A. Each pintle 12A is in turn pivotally mounted in pintle housing or socket 12B, which is fixedly attached to frame 20. Thus each wheel 14, its fork 12F, and pintle 12A can normally swivel in continuous circles (360°) in housing 12B and can assume any angle in between. I.e., the wheel can go from pointing straight ahead, where the wheel's axle trails as the stroller is pushed forward, to pointing directly backward, or 180° away (not shown), where the wheel's axle also trails as the stroller is pushed or pulled backward. This is the usual mode of operation of common casters.

The upper part of each pintle 12A is journaled in a steering arm 34 that is a cylindrical member attached to a flat arm. Each steering arm 34 also has, in its rear side, a threaded hole (not shown) into which is mounted a disconnect comprising a respective locking pin 32. When locking pin 32 is in its "in" or rider-steerable position, it mates with a hole 12D in the upper part of pintle 12A, thereby locking the pintle to steering arm 34. When locking pin 32 is pulled out to the externally controllable position, it is withdrawn from the hole in the upper part of pintle 12A, thereby allowing the pintle to swivel and be free of steering arm 34.

Locking pin 32 is a pull-type pin that is biased by a spring (not shown) into an inserted position. When the pin is pulled out, turning its ring will lock it in its disconnected position. Turning the ring again allows the pin to move into an inserted position. When wheels 14 pivot to the straight-ahead position, the pin will fall into a hole 12D to connect said steering arm 34 to the pintle.

FIG. 1B-Steering Linkage

Steering shaft 24 is journaled in the usual manner. Its upper end is connected to steering wheel 22 (FIG. 1A) and its lower end is connected to a radius arm 36. Arm 36 is a flat member that extends perpendicularly to shaft 24 and rotates therewith. The outer end of arm 36 is connected to the inner ends of a pair of tie rods 38, which are horizontally mounted elongated arms which extend out to the left and right of the radius arm. Thus, as the steering wheel is turned clockwise (top of wheel is moved to the right) or counterclockwise (top of wheel is turned to the left), the tie rods also move to the right and left, respectively.

The outer end of each tie rod is connected to the outer end of a respective steering arm 34. Thus as the steering wheel is turned to the right or to the left, the radius arm and the tie rods couple this motion to the steering arms, so that the steering arms also turn to the right and left, respectively. This connects the wheels so that they are constrained to turn together. This also provides a very simple, inexpensive, and reliable steering system. The geometry of the vehicle may be selected so that there will be substantially no skidding of the wheels. If the locking pins are in (rider-steerable position), each steering arm's rotation will be coupled to its pintle, so that the wheels will turn to the right or left in response to the turning of the steering wheel. If the locking pins are pulled out (externally controllable position), each steering arm will be decoupled from its pintle, so that the wheels can turn freely 360° to either the right or left and the steering wheel will be disengaged from the wheels.

A steering shaft release pin 40 (FIG. 1J) is provided to release the steering shaft from the radius arm pivot shaft for storage or transportation.

Operation

The operation of the stroller will be readily apparent to those skilled in the art from a reading of the above. However the brief review below provides an express explanation. Also, further details of all of the components are provided after this Operation section.

To use the stroller in the externally steerable mode, e.g., for children who are too young to pedal and steer it by themselves, or for a tired older child, both locking pins 32 are pulled out to enable the casters to swivel 360°. Now the stroller can be pushed and pulled by parent 18 (FIG. 1) and the casters will swivel and follow any direction in which the stroller is pushed or pulled. Even if the stroller is pulled backwards, the casters will swivel around 180° and correctly follow the direction of motion to facilitate such pulling.

To use the stroller in the rider-steerable mode, e.g., for children who are old enough to pedal and steer it by themselves, both locking pins 32 are inserted to engage the steering system with the casters. Now child 16 can pedal and steer the stroller without losing control.

Advantages: By providing both pushable and rider-steerable modes, the stroller is extremely versatile. While an ordinary pushable stroller has casters that can swivel 360°, it cannot be rider-steered. An ordinary pedalable child's go-cart does not have casters. Thus, while such a cart can be controlled by a child, it cannot be easily and completely controlled externally, i.e., by someone not in the cart, since the wheels will not swivel 360°. In contrast, simply adjusting the locking pins can easily and quickly control the stroller of the invention externally or internally.

Figure 1C:
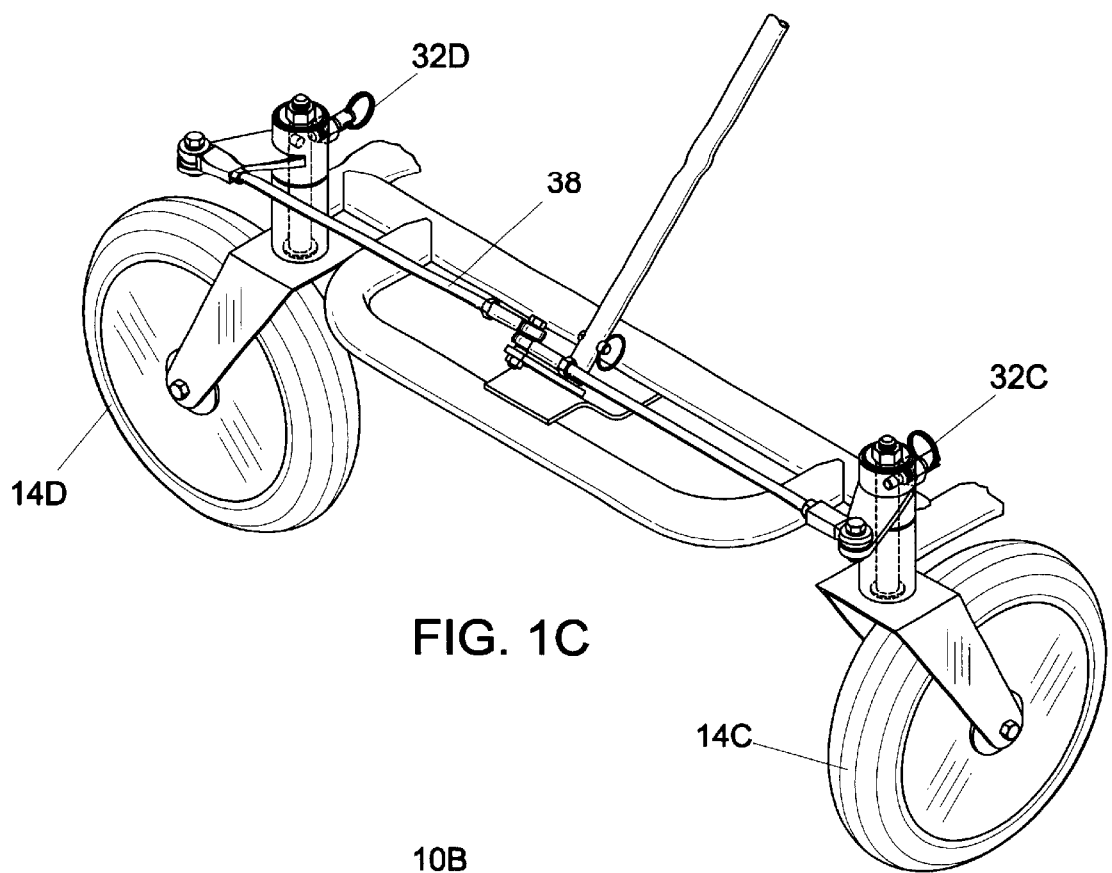
FIG. 1C is a view of the front end of the vehicle of FIG. 1A.

FIG. 1C-Connected and Disconnected Positions

FIG. 1C shows the steering mechanism and the casters in disconnected (right wheel/drawing upper left) and connected (left wheel/drawing lower right) positions. In an actual vehicle the two casters would not be in different states, but such different states are illustrated here in order to facilitate understanding. Ring 32D is shown pulled out so as to disconnect the right steering arm from the left, upper caster. This enables it to be freewheeling. Note that wheel 14D is shown turned sharply to the right. It can assume any position within a 360° range and movement of tie rods 38 has no effect on it. Ring 32C is shown inserted so as to connect the left steering arm to the caster to enable it to be controlled by the steering mechanism. Note that wheel 14C is shown pointed straight ahead. It can assume any position within about a 90° range and will fully respond to movement of tie rods 38.

FIG. 1D-Front View

Figure 1D:
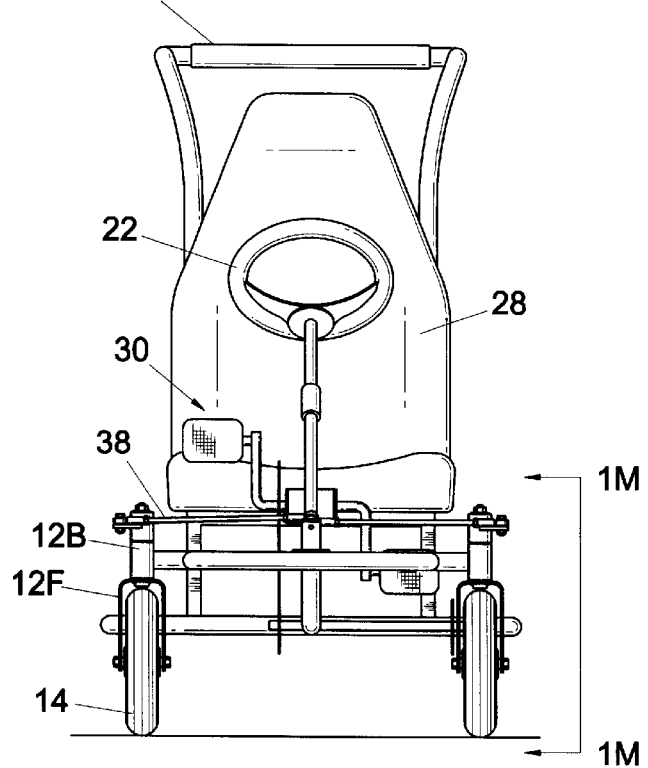
FIG. 1D is a front view of the child's vehicle of FIG. 1A.

FIG. 1D is a front view of the stroller with the wheels pointing straight ahead. Note the positions of the tie rods, the pedals, and the pintle housings and forks. The rear wheels are not shown for clarity.

FIGS. 1E–1G, 1K, and 1L-Operation of Steering Mechanism

Figure 1E:
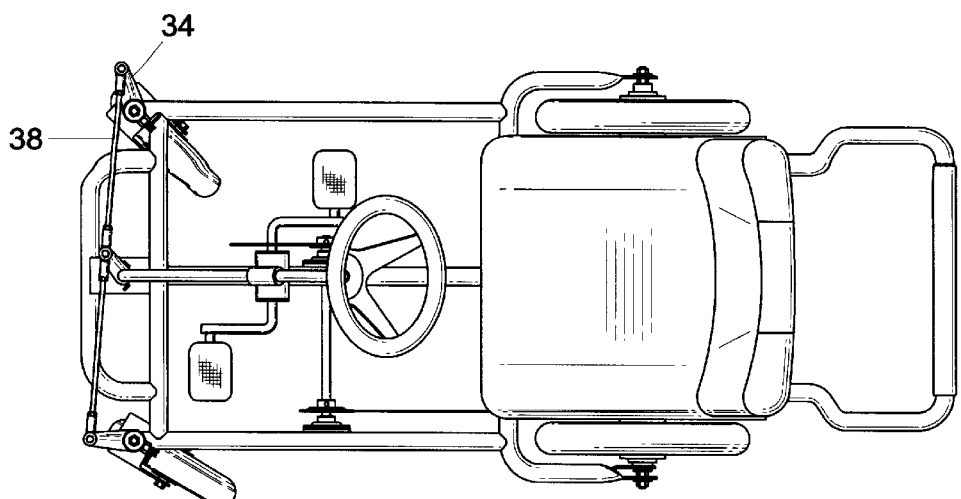
FIGS. 1E to 1H are top views of the child's vehicle of FIG. 1A making a right turn (FIG. 1E), going straight (FIG. 1F), making a left turn (FIG. 1G), with its steering arms disconnected (FIG. 1H)
Figure 1F:
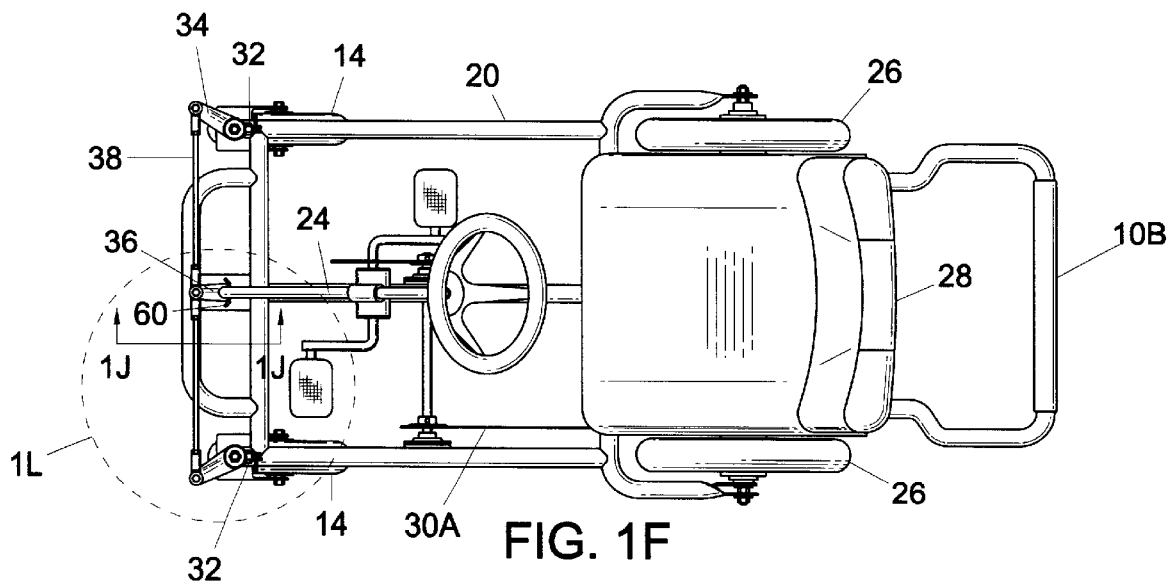
Figure 1G:
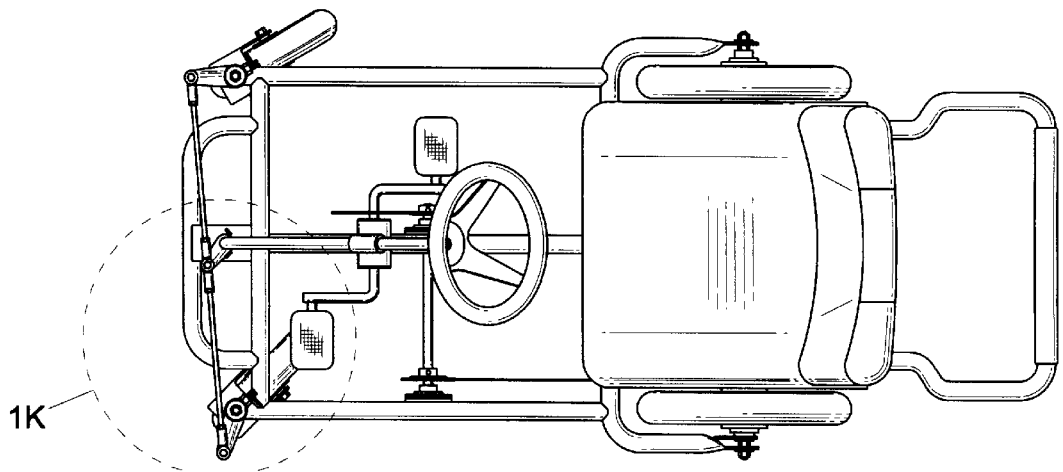

FIGS. 1E to 1I are top views of the stroller of FIG. 1A and are provided to illustrate the operation of the steering mechanism. The stroller is making a right turn (FIG. 1E), going straight (FIG. 1F), and making a left turn (FIG. 1G). In these figures, the steering arms are connected. In FIGS. 1E to 1G, the stroller is in the rider-steerable mode (locking pins 32 are in). In FIG. 1E the steering wheel has been turned to the right as much as possible. Wheels 14 are accordingly turned about 45° to the right. The degree by which it can be turned is limited to about 45° in each direction. This is because, as the wheels are turned to the right, tie rod 38 rotates clockwise. I.e., it rotates from a position perpendicular to the direction of travel (FIG. 1F) to a position where it is angled so that its left side moves forward and its right side moves back (FIG. 1E). When its right side moves back, it hits the upper portion of right steering arm 34 and thereby limits the degree of by which it can be turned to the right. Similarly, as shown in FIG. 1G, when the wheel is turned to the left, the left side of the tie rod hits the left steering arm and thereby limits the degree of by which it can be turned to the left.

Note that when the wheel is turned to the right, steering arm 34 on the right side is turned sharply to the right and the other steering arm is straight ahead. When the wheels are pointed straight ahead, the steering arms are angled slightly outward. When the wheel is turned to the left, steering arm 34 on the left side is turned sharply to the left and the right steering arm is straight ahead. The steering angles are precisely controlled to satisfy the optimum steering arrangement so that a lateral jamming of the steering wheels and increased wear on the tires is avoided. By "the optimum steering arrangement" I mean that the steering wheels are turned so that their axes lie precisely on the radii of the curve traveled. The wheel on the inside of the curve therefore has a greater steering orientation than the external wheel, so its steering angle is therefore essentially inversely proportional to the radius of curvature.

Figure 1H:
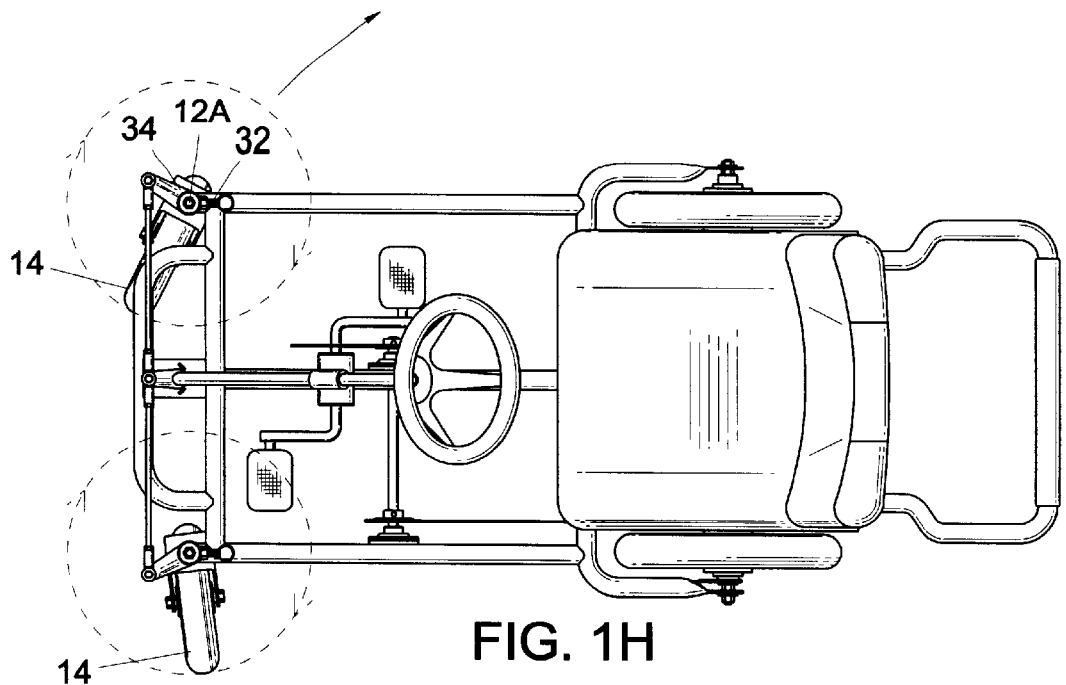
Figure 1I:
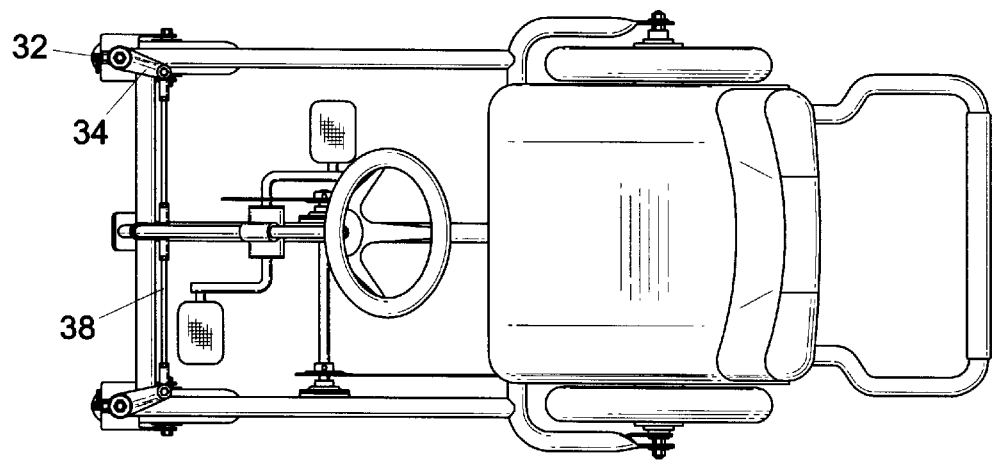
FIG. 1I is a top view of the stroller with tie rods behind its wheel pintles.
Figure 1J:
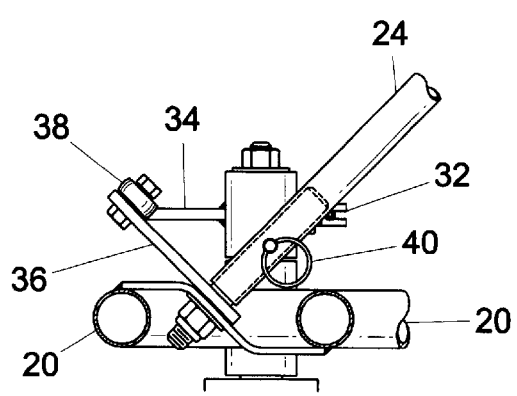
FIG. 1J is a side view of a steering mechanism of the vehicle of FIG. 1A showing a removable steering shaft taken along the lines 1J—1J of FIG. 1F.
Figure 1K:
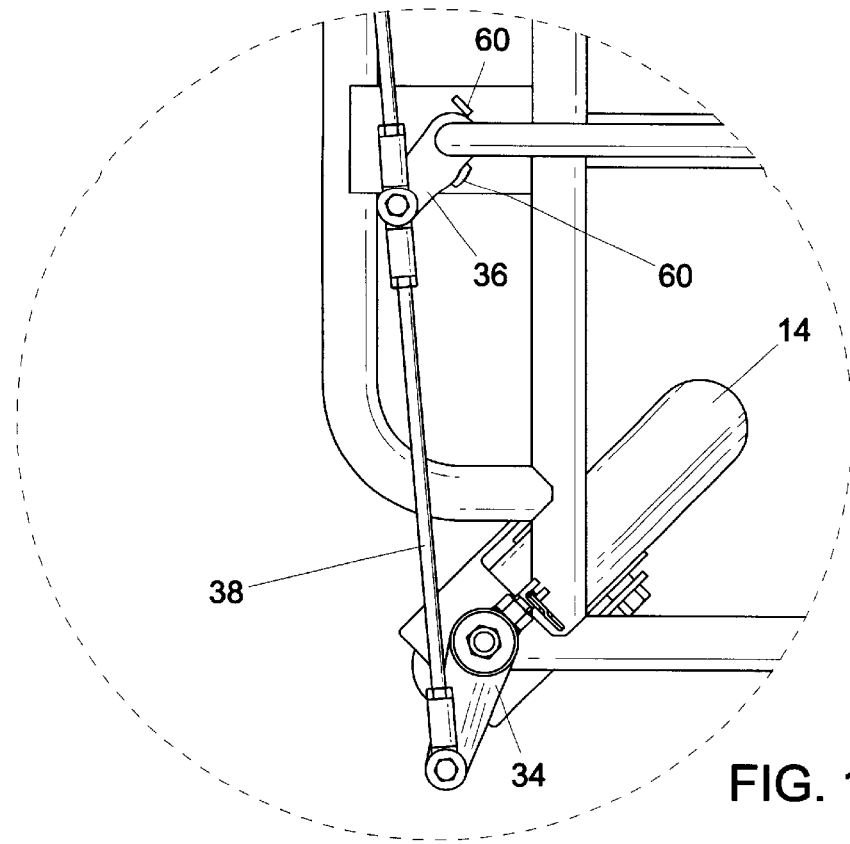
FIG. 1K is an enlarged view of a steering link of the child's vehicle of FIG. 1A, as indicated by circled portion 1K of FIG. 1G.
Figure 1L:
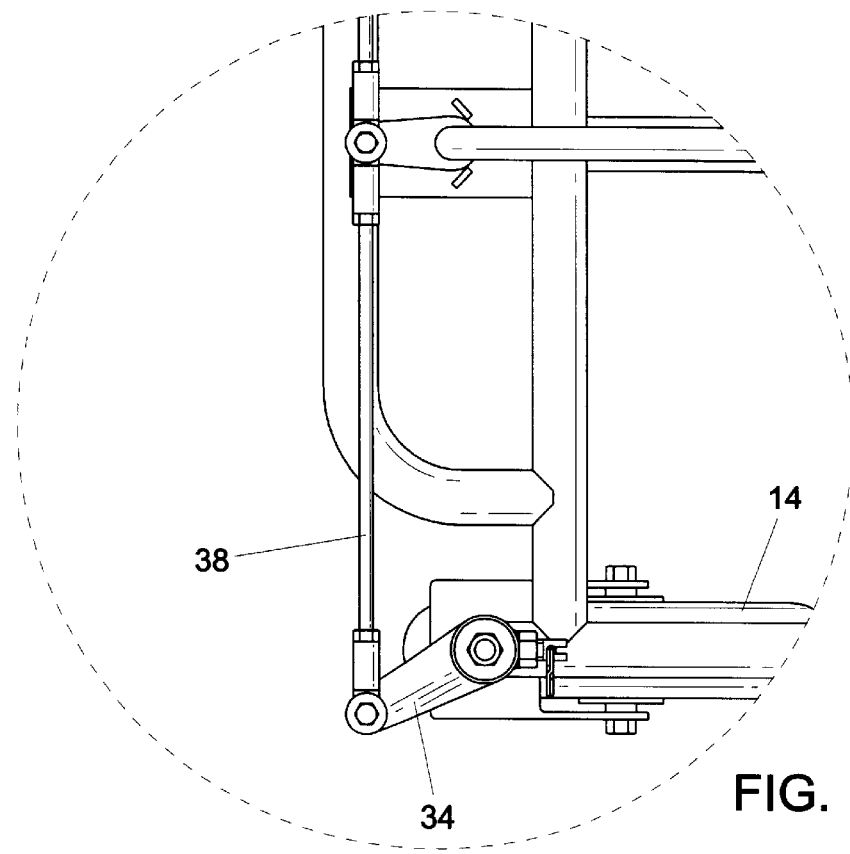
FIG. 1L is an enlarged view of a steering link of the child's vehicle of FIG. 1A, as indicated by circled portion 1L of FIG. 1F.

FIG. 1K shows a detailed view of the left side of the tie rod hitting the left steering arm, while FIG. 1L shows a detailed view of the left tie rod and steering arm when the wheels are pointed straight ahead.

Various other ways to limit travel of the wheels to the right and left when the stroller is in the rider-steerable mode are possible, e.g., by means of steering stops 60, as illustrated in FIGS. 1K and 1L. These modes are more advantageous in that a steering component is not used to limit travel, but these modes require additional components.

In addition to placing the tie rods in front of the pintles as shown in FIGS. 1A to 1H, the tie rods can also be mounted behind the pintles, as indicated in FIG. 1I.

FIG. 1H-Externally Controllable Mode

In FIG. 1H, the stroller is in the externally steerable mode, i.e., locking pins 32 are pulled out. Steering arm 34 are disconnected from pintles 12A so that wheels 14 are freewheeling and can turn 360° as indicated by the circles with arrows. The stroller is being turned sharply to the right, pivoting from the left rear wheel, by the parent (not shown). This causes the wheels to turn right to follow the stroller's motion.

Figure 1M:
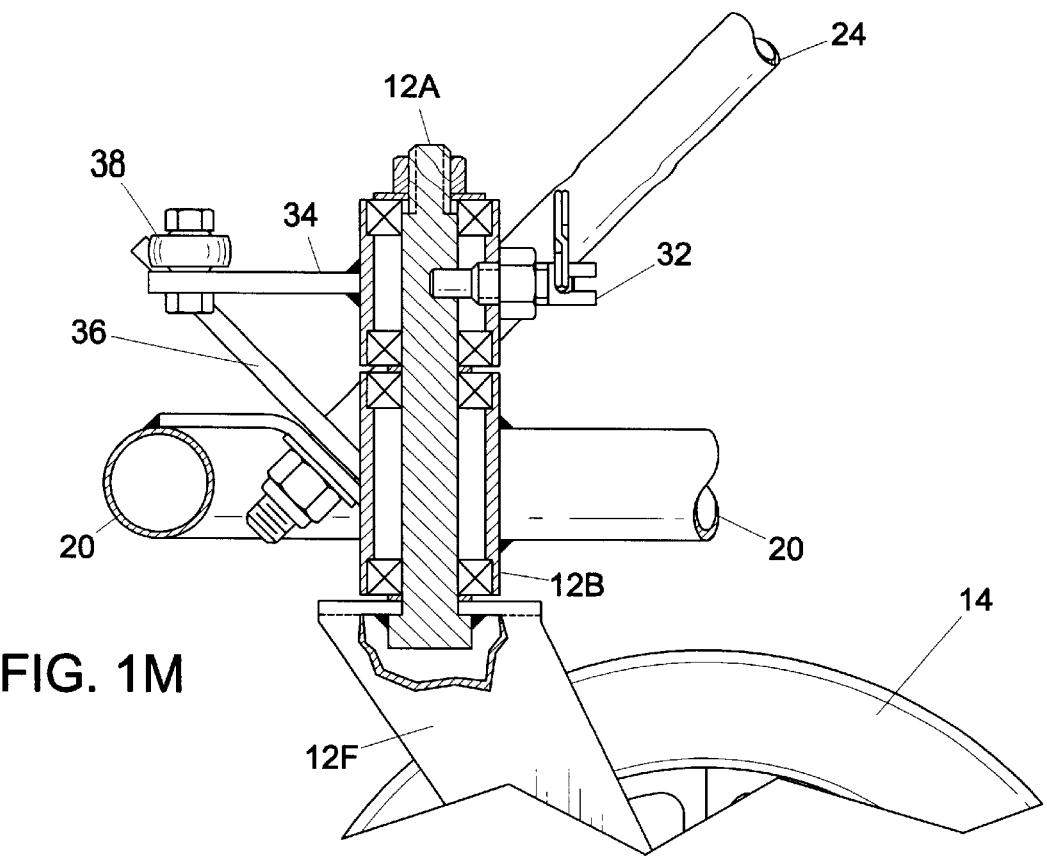
FIGS. 1M and 1N are side sectional views of the caster of FIG. 1A in rider-steerable and pushable modes taken along lines 1M—1M of FIG. 1D.
Figure 1N:
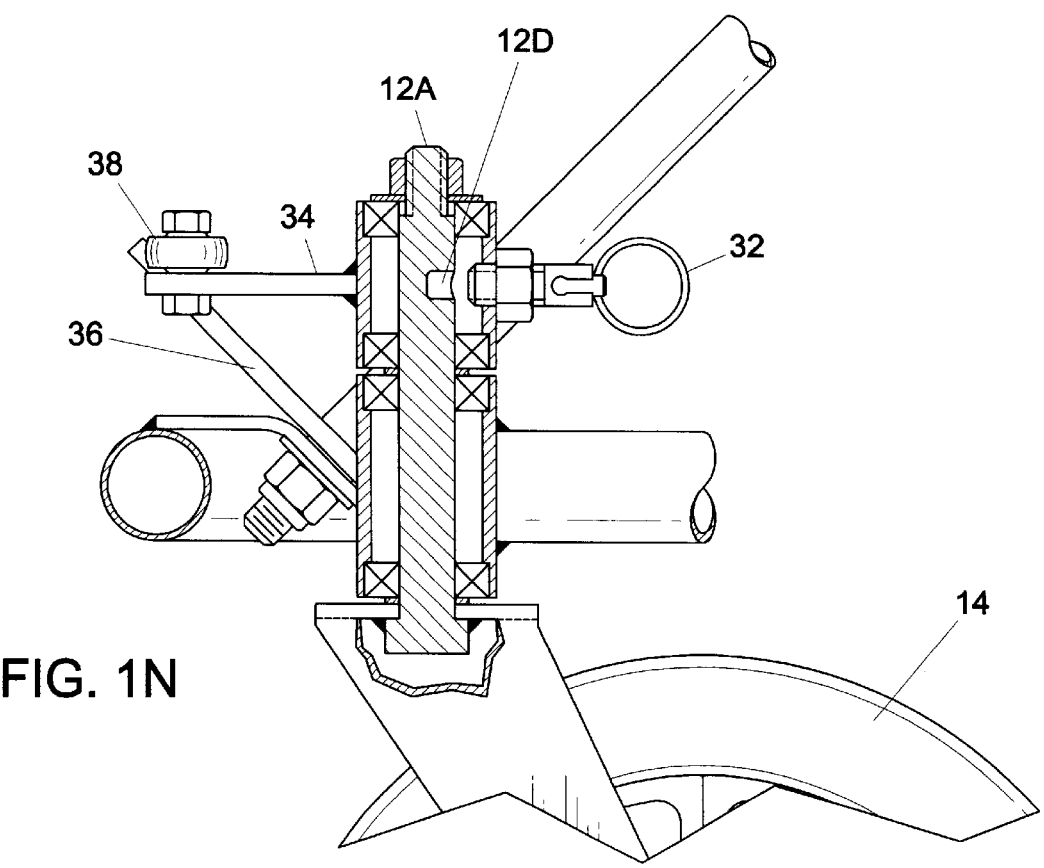
Figure 10:
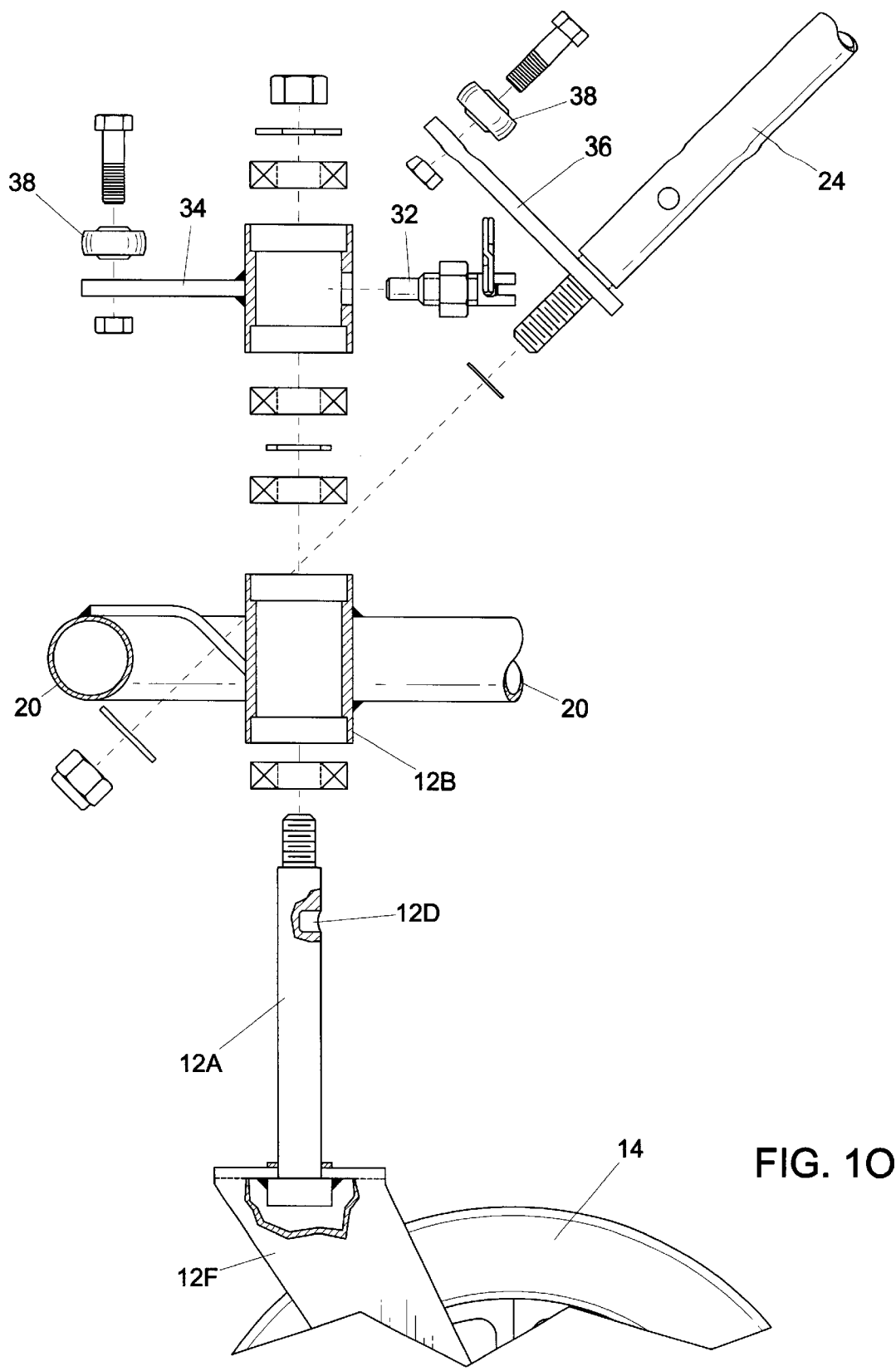

FIGS. 1M and 1N

FIGS. 1M and 1N are side sectional views of the caster of FIG. 1A in rider-steerable and pushable modes taken along lines 1M—1M of FIG. 1D.

Note from FIG. 1M that pin 32 is inserted, thereby connecting pintle 12A to steering arm 34. Thus when the tie rod 38 turns steering arm 34, it will also turn the pintle, causing the wheel below to turn.

In FIG. 1N, pin 32 is pulled out from hole 12D, disconnecting pintle 12A from steering arm 34. Thus when the tie rod turns steering arm 34, this rotation will not be coupled to the pintle, allowing the wheel below to turn freely.

FIG. 1O-Exploded View

FIG. 1O is a detailed exploded view of the presently preferred construction of the steering mechanism, including the pintle, its housing, and the steering arm. Note the various bearings and other hardware, which will be readily understood by those skilled in the art and thus need not be detailed here.

Figure 1P:
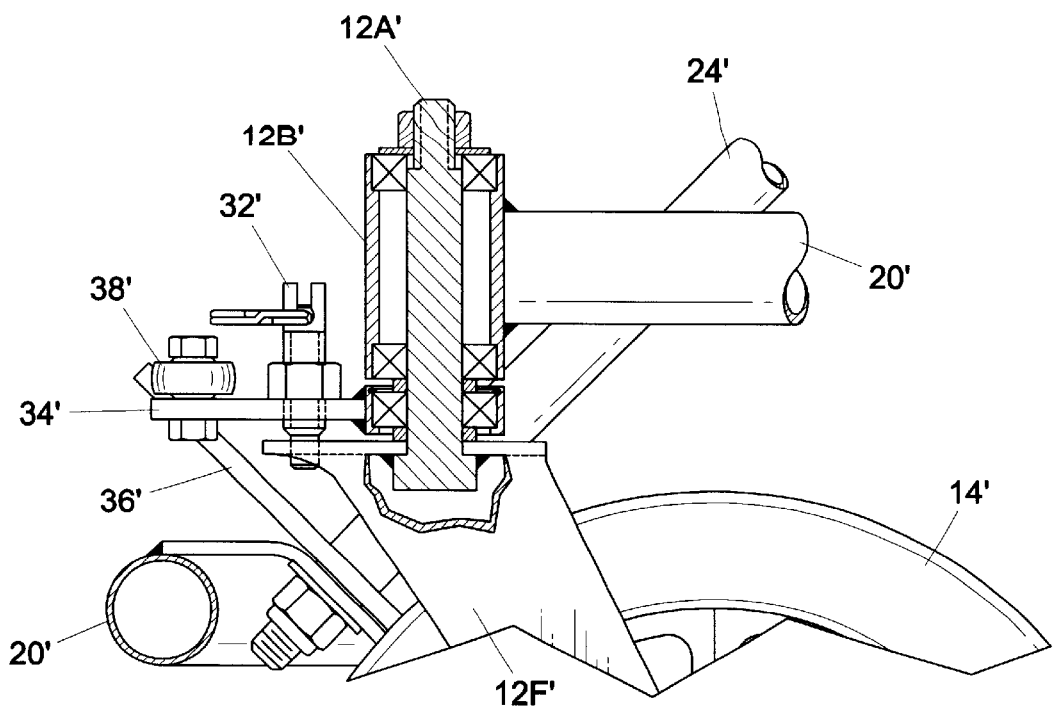
FIG. 1P and 1Q are side sectional views of the caster of FIG. 1A in a rider-steerable and pushable modes with a locking pin connected and disconnected to a fork taken along lines 1M—1M of FIG. 1D.
Figure 1Q:
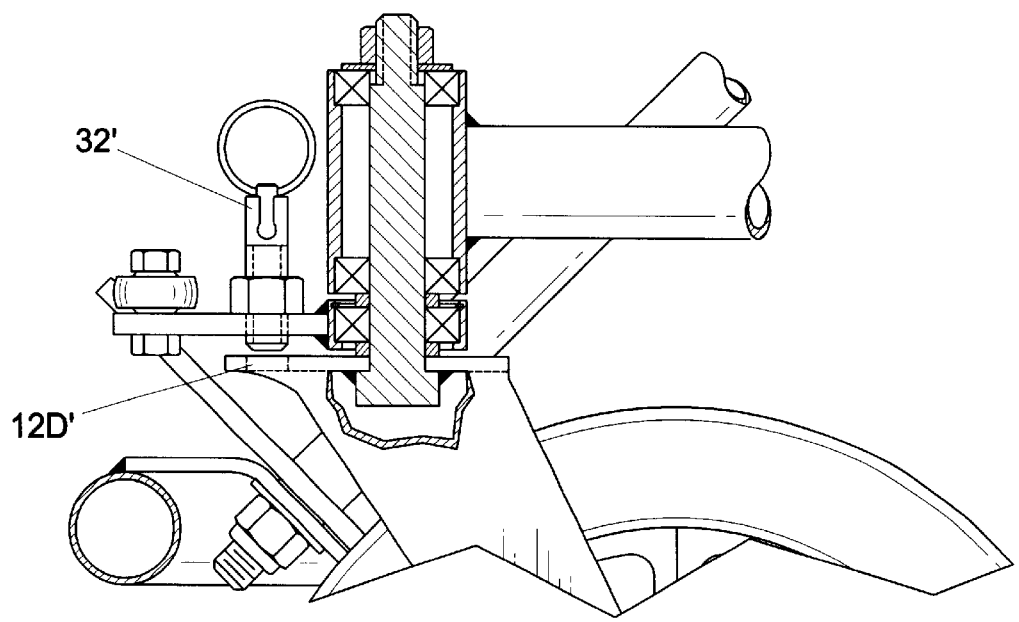

FIGS. 1P and 1Q-Alternative Locking Pin Location

In lieu of locking or unlocking the pintle to the steering arm, the casters can be connected or disconnected to the steering mechanism by locating the locking pins elsewhere. FIGS. 1P and 1Q show an alternative location. The upper bridge or bight portion of fork 12F' has a recess 12D'. Steering arm 34' is located adjacent and parallel to fork bridge 12F'. Locking pin 32' is mounted on steering arm 34'.

When the pin of locking pin 32' is inserted (FIG. 1P), it will lock the steering arm to the fork bridge. This will connect the steering mechanism to the fork and wheels, thus putting the stroller in the rider-controllable mode as before. When locking pin 32' is pulled out (FIG. 1Q), the fork bridge will be disconnected from the steering arm, so that the wheels will be freewheeling and the stroller will be in the externally controllable mode.

FIG. 2A to 2E-Alternative Stroller or Scooter

Figure 2A:
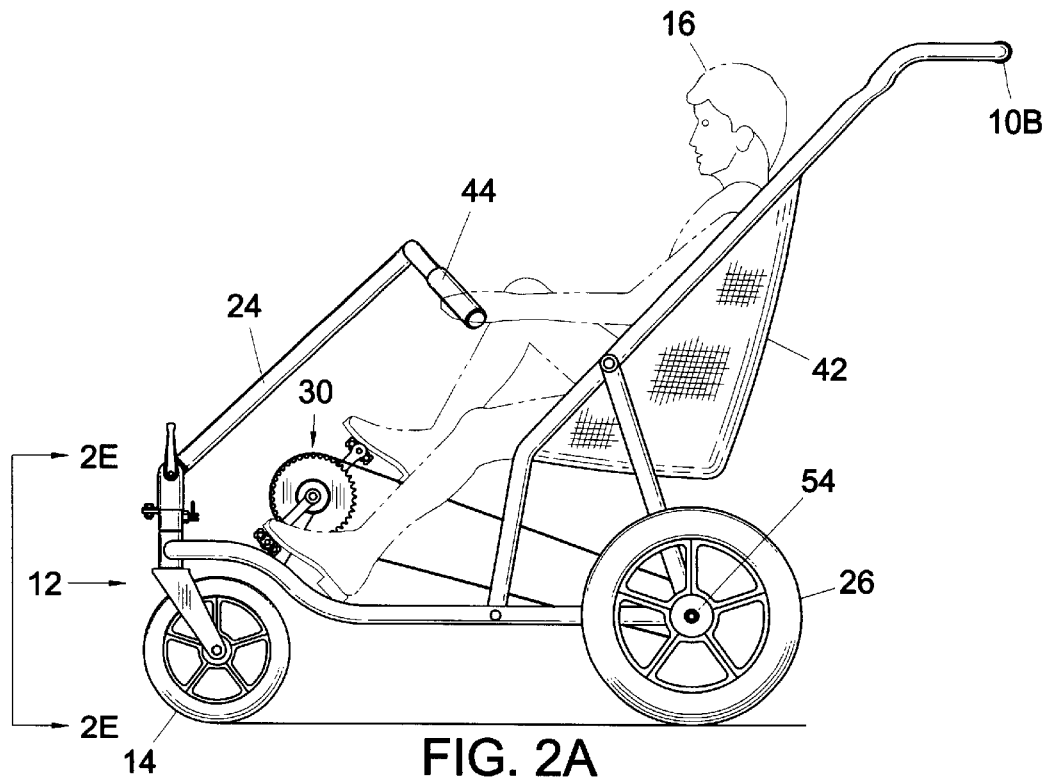
FIG. 2A is a side view of a pedalable vehicle with handlebars and one caster according to the invention.

FIG. 2A is a side view of a pedalable vehicle with handlebar and one caster according to the invention. In lieu of a seat, it has a shell or cloth bucket seat 42 and a single stage pedal assembly 30 is connected to freewheel mechanism 54. This vehicle is otherwise like the vehicle of FIG. 1A, so only its differences will be discussed.

Figure 2B:
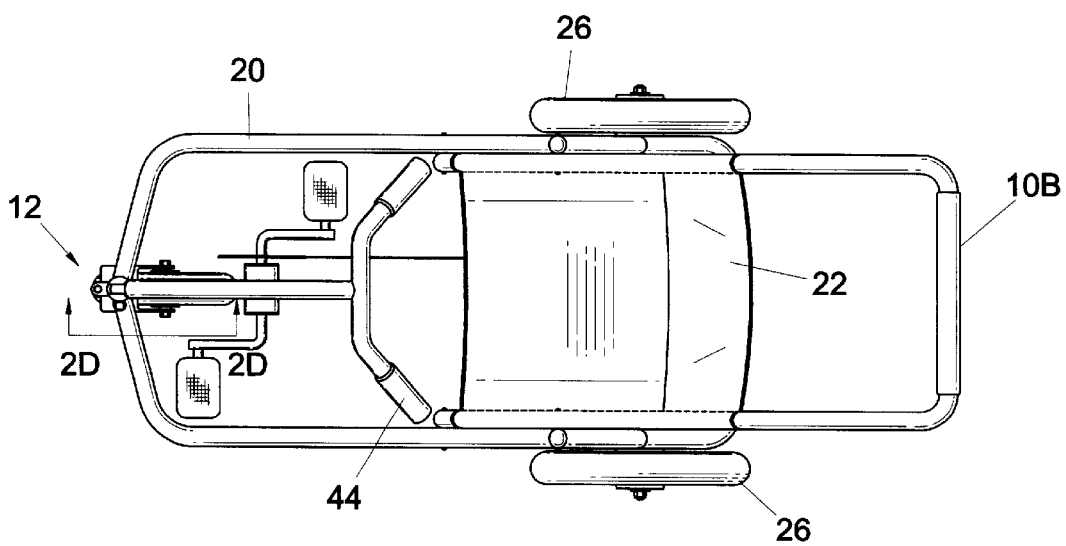
FIG. 2B is a top view of the vehicle of FIG. 2A.
Figure 2C:
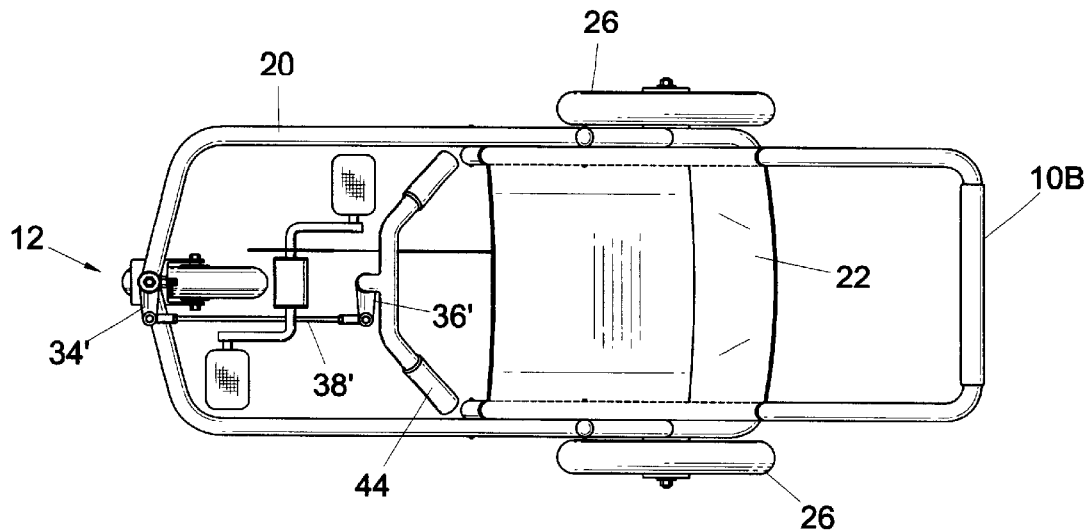
FIG. 2C is a top view of the vehicle of FIG. 2A with push and pull type steering.
Figures 2D, 2E:
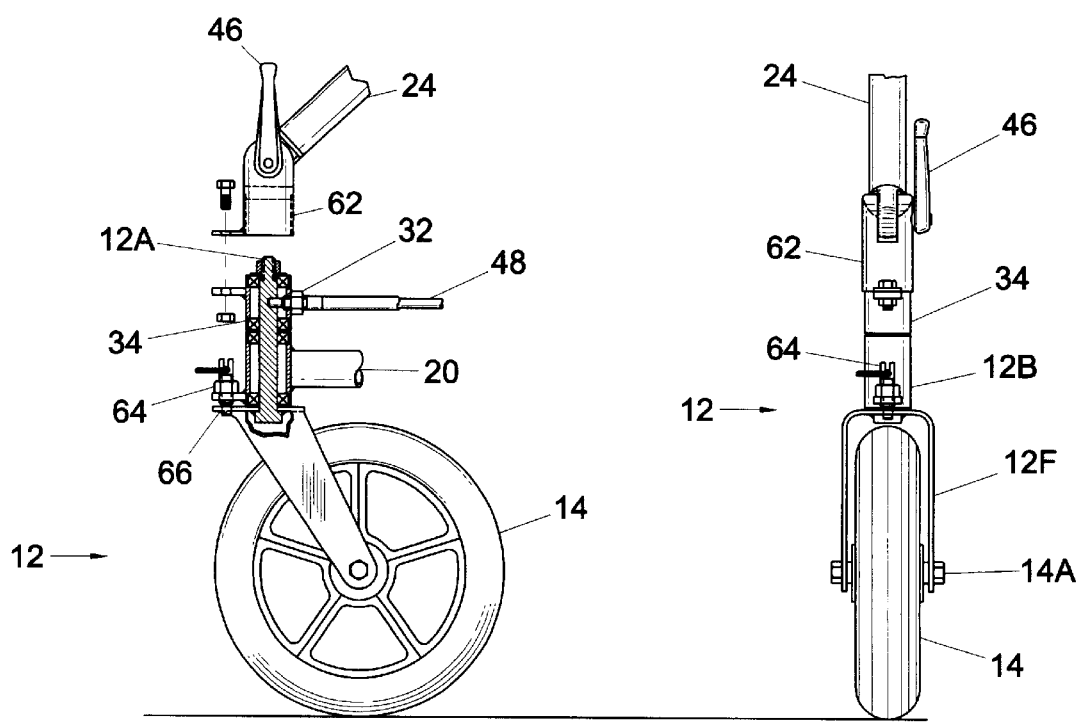
FIG. 2D is a side view of a caster of the vehicle of FIG. 2B taken in the direction indicated by the lines 2D—2D of FIG. 2B.
FIG. 2E is a front view of the caster taken along the lines 2E—2E of FIG. 2A.

In lieu of a steering wheel the vehicle has handlebar 44, best seen in the top view of FIG. 2B. As shown in FIGS. 2C, 2D, and 2E, its single caster 12 is identical to the caster of the vehicle of FIG. 1A, including its pintle 12A. Steering shaft 24 is attached to coupling 62 with release lever 46. The release lever is used to adjust the angle of steering shaft 24 and is also used for folding the shaft for storage. Coupling 62 is attached to steering arm 34 with bolts and nuts (FIG. 2D). Thus it turns as one unit.

A cable 48 is connected to locking pin 32 so that the pin can be remotely released by the rider or a pusher. The upper part of cable 48 is not shown, but has a locking and unlocking mechanism similar to that in locking pin 32 of FIG. 1B and can be mounted on push handle 10B.

The operation of the stroller is similar to that of FIG. 1A, except that only one locking pin need be released or connected to convert the stroller from a rider-steerable mode to an externally steerable mode. The locking pin is released by pulling cable 48. Also the stroller is steered by its rider using handlebar 44 instead of a wheel. When the stroller is in the externally steerable mode, steering shaft 24 is decoupled from pintle 12A by locking pins 32 and cable 48.

FIG. 2C shows a different arrangement for a steering control. A handlebar 44 is connected to a radius arm 36'. The steering control is transmitted from the radius arm 36' to a steering arm 34' by way of at least one tie rod 38'. As the handlebar 44 is turned to the right or to the left, the radius arm 36' and the tie rod 38' couple this motion to the steering arm 34', so that the steering arm also turn to the right and left, respectively.

The vehicle can have a swivel lock 64 with a mating recess 66 which selectively prevents swiveling movement of the front wheels when the operator desires to push the vehicle straightforward over uneven ground. This situation occurs, e.g., where one wheel may become separated from contact with the ground, or when the operator wishes to use it as a jogging stroller.

The stroller of FIG. 2A is cheaper to make and lighter than the stroller of FIG. 1A, but has less stability due to its single front wheel. A three-wheel design is popular among users of jogging strollers and scooters because of its relatively small (tight) turning radius.

Figure 3A:
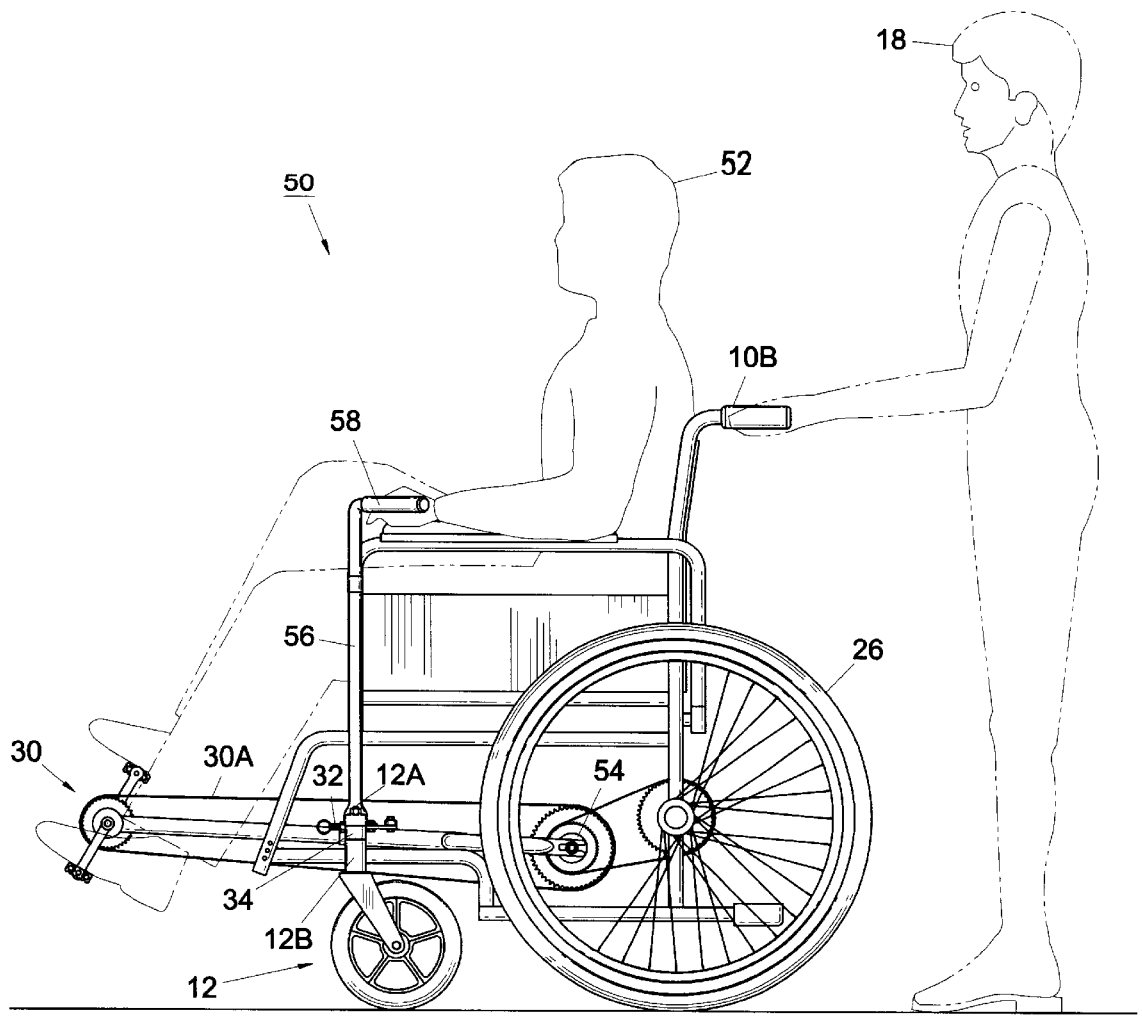
FIG. 3A is a side view of a pushable and steerable-pedalable wheelchair according to the invention.
Figure 3B:
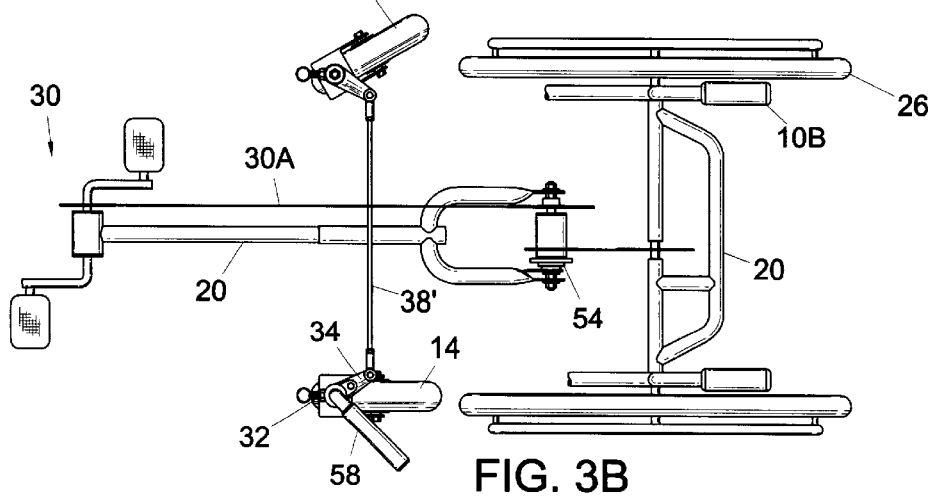
FIG. 3B is a top view of the wheelchair with a tiller on one side.
Figure 3C:
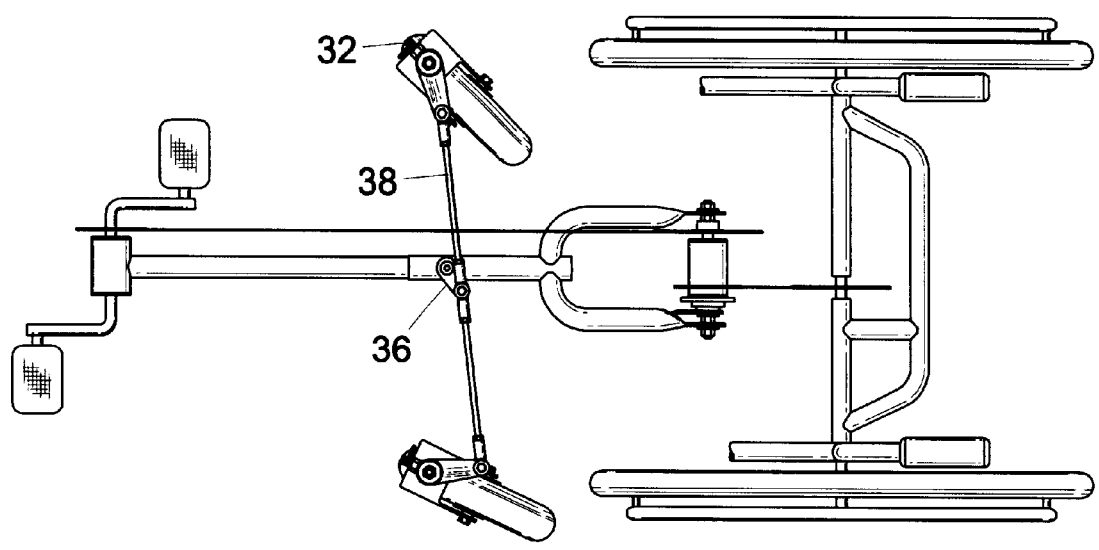
FIG. 3C is a top views of the wheelchair making a right turn and with a center-mounted radius arm.

FIGS. 3A To 3C-Wheelchair

A wheelchair version of the vehicle of the invention is illustrated in FIGS. 3A to 3C. Its construction and operation are generally similar to the previous embodiments, except that the concept is embodied in a wheelchair, rather than a stroller.

As shown in FIG. 3A, a wheelchair 50 has the usual seat, large wheels that have associated handwheels that can be used to propel the chair by the seated occupant 52. The chair also has a pedal assembly 30 that is connected to the rear wheel by conventional sprockets and chains and freewheel mechanism 54. The chair also has two front casters 12 that are similar to those of FIG. 1A. I.e., the casters have pintles 12A with pintle housings 12B and steering arms 34 with locking pins 32.

When the steering arms are disconnected from pintles 12A by pulling out the locking pins, the casters are freewheeling, as with the stroller of FIG. 1A. However when the locking pins are inserted, the steering arms are connected to the pintles. Note from FIG. 3B, a top view of the chair, that the locking pins are pulled out and pintles 12A are disconnected from respective steering arms 34, which are joined by a single tie rod 38'. Note that wheel 14 is freewheeling.

Steering arm 34 of the left wheel is connected to a tiller 56 (FIG. 3A), which has a tiller handle 58. The tiller is suitably pivoted and handle 58 is in a position where occupant 52 can conveniently turn it. The tiller can be mounted on either side. When the occupant turns the tiller, it will accordingly turn left steering arm 34. If the locking pins are inserted, this will in turn rotate the left pintle, which will turn left wheel 14. Since the two front wheels are connected together by tie rod 38' and steering arms 34, both wheels will turn together.

However if the locking pins are pulled out, turning the tiller will turn steering arm 34, but not the pintle, so that the front casters will be freewheeling. This is illustrated in FIG. 3A. FIG. 3C shows the vehicle is turning right with a centrally mounted radius arm 36.

In use, the locking pins can be pulled out to make the casters freewheeling. Then caregiver 18 can push and pull the wheelchair and the casters will follow, in any direction. When rider 52 desires to control the chair, the locking pins are inserted. This connects tiller 56 to the casters so as to enable the rider to steer the chair by use of tiller handle 58.

Since the user can operate the tiller and pedal the wheelchair, it provides the user with an opportunity to increase their exercise, thereby providing the salutary benefits of exercise. These are a decrease the incidence of muscle atrophy, osteoporosis, venous stasis (poor circulation), decubitus ulcers (bedsores), body and mental health deterioration, and stiffening of joints, as well as cardiovascular conditioning and an overall increase in the quality of life, and avoidance of body and mental health deterioration, Conclusions, Ramifications, Scope Thus the reader will see that the vehicle of the invention is unique and highly maneuverable, yet is quickly and easily convertible to or from a castered vehicle that can be used by persons of almost any age.

Furthermore, the vehicle has the following additional advantages:

it overcomes the disadvantages of conventional vehicles;
it combines the advantages of an externally propelled vehicle with casters, such as a conventional stroller, and a vehicle without casters, such as pedal cars;
a child-operator can efficiently steer and propel themselves;
it can be pushed while walking behind the vehicle, as with a stroller, to guide and control the direction of travel, while allowing the occupant child to participate in the propulsion and guidance process;
it allows a child to gradually become a participant in the propulsion and guidance process to enhance development of mental and physical skills;
it enables people with limited mobility who wish to travel to go further than their canes or walkers allow, thereby adding a new dimension to their daily lives;
it adds rider-steering capability to strollers, wheelchairs, and other child's vehicles;
it has a steering wheel or bar for steering control by hand, and a pedal mechanism for driving (propelling) by foot;
it is particularly adapted for use by children and patients who need exercise;
it maximizes efficiency so as to make best use of the strength of the operator;
it is steerable vehicle and fun to operate, while avoiding the disadvantages and deficiencies of other vehicles;
it has a short turning radius;
it enables children to play, and can be utilized for shopping;
it has means for disconnecting its steering control when a caregiver pushing the vehicle needs to control the vehicle, as in a shopping mall, store, or when jogging;
a child can propel it as long as the child wants to do so, and it then allows the supervising person to continue propelling the vehicle, thereby eliminating the need carry both the child and the vehicle;
it enables children to learn about safety and operation to develop driving skills;
it has a caster assembly which can be disconnected from the steering mechanism so that its wheels can be freely swiveled;
it provides a wheelchair which can translate leg movement into forward motion, thereby to exercise the occupant, especially arthritic and cardiac patients;
it provides a wheelchair which alleviates the problem of front wheel instability when the wheelchair is operated at high speeds;
it has a disconnectable steering mode which is very convenient in that the occupant or the caregiver can control the direction of travel;
it provides an alternative method of travelling when the balance required for bicycling is a problem;
it provides a vehicle which a child can enjoy riding anywhere with their parents, and not just in protected areas, like a back yard While my above description contains many specificities, these should not be construed as limitations on the scope of the invention, but rather as an exemplification of one preferred embodiment thereof. The following other variations are possible:

The disconnecting device can have other mechanisms, such as screw-in pins, pivotable locking levers, groove-pins, interlocking teeth, projecting lugs, etc.

The locking pin can be urged by gravity rather than by a spring to the engagement position. Also it can be designed to operate automatically, i.e., it engages when the pushbar is folded down.

The disconnecting device can also be used with other wheeled vehicles such as scooters and lawnmowers in a riding or walking mode.

The location of disconnecting point can be in different places as long as it is between steering mechanism and the caster so that the caster can swivel freely.

The frame or body can have different shapes and may be constructed of any suitable materials such as metal, plastic, or wood. Its body can be made of sheet metal, tubing (even a single fore-and-aft tube), castings, forgings, etc.

The number of wheels of the vehicle can be three or four as illustrated, or any other number.

One or more wheels can be mounted to a side of the vehicle.

The steering mechanism can be a wheel, a tiller, a bar, a handle, a breath-, eyeball-movement-, or voice-responsive device, etc.

The wheelchair can have a steering wheel instead of a tiller, it can have one center-mounted caster instead of two, and the pedals or the hand propulsion wheel can be omitted. The vehicle need not be controlled by a person or rider, but instead can be "self" controlled by a program for directing its directions and distance, an electronic or magnetic track or other guidance system to which sensors on the vehicle are responsive, or by an person-operated remote control coupled to the vehicle by wire, radio, light, etc.

Accordingly, the scope of the invention should be determined not by the embodiments illustrated, but by the appended claims and their legal equivalents.

I claim:

1. A vehicle which can be rider-steered or externally steered, comprising:
   a vehicle frame or body for carrying an occupant thereon, said vehicle frame or body having a front, a rear, and a mid-portion extending between said front and said rear, said midportion having left and right sides,
   at least one wheel mounted on said vehicle for enabling said vehicle to be rolled over a surface, said wheel being parallel to said left and right sides of said vehicle frame or body,
   at least one swivelable caster containing a rotatable wheel and mounted on said vehicle for enabling said caster to swivel so that said vehicle can be rolled in any direction, said caster being positioned at a midpoint between said left and right sides,
   a steering control on said vehicle, said steering control positioned so that it can be operated by said occupant carried on said vehicle, and
   a disconnect for selectively connecting or disconnecting said steering control from said caster so that (1) when said disconnect connects said steering control to said caster, said occupant carried thereon will be able to turn said steering control and thereby swivel said caster and steer said vehicle, and (2) when said disconnect disconnects said steering control from said caster, said caster will be able to swivel freely so as to enable said vehicle to be externally steered in any direction,
   whereby said vehicle can be quickly and easily converted back and forth between externally steered and steered by said occupant thereof, yet said vehicle will have directional stability, can be used on rough surfaces, and can be rapidly propelled.

2. The vehicle of claim 1 wherein said steering control comprises a device selected from the class consisting of wheels, tillers, bars, and steering linkages.

3. The vehicle of claim 1 wherein said disconnect comprises a pin which is spring urged in one direction.

4. The vehicle of claim 3, further including a cable connecting said pin to a location so that a person external to said vehicle can operate said pin.

5. The vehicle of claim 1 wherein
   (a) said caster comprises a fork, a pintle, and a pintle housing in which said pintle can swivel,
   (b) said vehicle further includes a steering arm coupling said steering control to said caster, and
   (c) said disconnect comprises an axially moveable pin which is spring urged in one direction and which extends through a portion of said steering arm to a recess in one of said pintle and said fork, so that insertion of said pin into one of said recesses will enable said steering control to swivel said pintle.

6. The vehicle of claim 1 wherein said vehicle is selected from the class consisting of strollers, children's vehicles, wheelchairs, scooters, and carts.

7. The vehicle of claim 1 wherein
   (a) said steering control comprises a device selected from the class consisting of wheels, tillers, bars, and steering linkages,
   (b) said caster comprises a wheel which is rotatably mounted on a fork, with a pintle extending upwardly from said fork and pivotally mounted in a pintle housing,
   (c) said vehicle further including a steering arm coupling said steering control to said caster, and
   (d) said disconnect comprises an axially moveable pin which is spring urged in one direction and which extends through a part of said steering arm to a recess in one of said pintle and said fork, so that insertion of said pin into one of said recesses will enable said steering control to swivel said pintle.

8. The vehicle of claim 1 wherein said caster is mounted adjacent said front portion of said vehicle and said wheel is mounted adjacent said rear portion of said vehicle.

9. The vehicle of claim 1 wherein said steering control comprises a rotatable member, a shaft extending down from said rotatable member, and a steering arm coupling said shaft to said caster so that rotation of said steering control will rotate said caster, and further including means for limiting the swivel range of said caster when said disconnect connects said steering control to said caster, and for allowing said caster to rotate 360° when said disconnect disconnects said steering control from said caster.

10. The vehicle of claim 1, further including a pedal mechanism on said vehicle for enabling said occupant to propel said vehicle.

11. A vehicle which can be rider-steered or externally steered, comprising:
    a vehicle frame or body for carrying an occupant thereon, said vehicle frame or body having a front, a rear, and a mid-portion extending between said front and said rear, said mid-portion having left and right sides,
    at least one wheel mounted on said vehicle for enabling said vehicle to be rolled over a surface, said wheel being parallel to said left and right sides of said vehicle frame or body,
    a pair of swivelable casters, each containing a rotatable wheel and being mounted on said vehicle for enabling said caster to swivel so that said vehicle can be rolled in any direction, said casters being positioned symmetrically with respect to said left and right sides, said casters being selectively coupled so that they can be constrained to swivel together or individually,
    a steering control on said vehicle, said steering control positioned so that it can be operated by said occupant carried on said vehicle, and
    a pair of disconnects for selectively connecting or disconnecting said steering control from said casters so that (1) when said disconnects connect said steering control to said casters, said occupant carried thereon will be able to turn said steering control and thereby swivel said casters and steer said vehicle, and (2) when said disconnects disconnect said steering control from said casters, said casters will be able to swivel freely so as to enable said vehicle to be externally steered in any direction,
    whereby said vehicle can be quickly and easily converted back and forth between externally steered and steered by an occupant thereof, yet said vehicle will have directional stability, can be used on rough surfaces, and can be rapidly propelled.

12. The vehicle of claim 11 wherein said steering control comprises a device selected from the class consisting of wheels, tillers, bars, and steering linkages.

13. The vehicle of claim 11 wherein said disconnect comprises a pin which is spring urged in one direction.

14. The vehicle of claim 13, further including a cable connecting said pin to a location so that a person external to said vehicle can operate said pin.

15. The vehicle of claim 11 wherein (a) each of said casters comprises a fork, a pintle, a pintle housing in which said pintle can swivel, (b) said vehicle further includes a pair of steering arms coupling said steering control to said casters, and (c) each of said disconnects comprises an axially moveable pin which is spring urged in one direction and which extends through a respective one of said steering arms to a recess in one of said pintle and fork, so that insertion of said pin into one of said recesses will enable said steering control to swivel said pintle.

16. The vehicle of claim 11 wherein (a) said steering control comprises a device selected from the class consisting of wheels, tillers, bars, and steering linkages, (b) each of said casters comprises a wheel which is rotatably mounted on a fork, and a pintle extending upwardly from said fork and pivotally mounted in a pintle housing, (c) said vehicle further including a pair of steering arms coupling said steering control to said casters, and (d) each of said disconnects comprises an axially moveable pin which is spring urged in one direction and which extends through a respective one of said steering arms to a recess in one of said pintle and said fork, so that insertion of said pin into one of said recesses will enable said steering control to swivel said pintle.

17. The vehicle of claim 11 wherein said casters are mounted adjacent said front portion of said vehicle and said wheel is mounted adjacent said rear portion of said vehicle.

18. The vehicle of claim 11 wherein said steering control comprises a rotatable member and a shaft extending down from said rotatable member, and a pair of steering arms coupling said shaft to said casters so that rotation of said steering control will rotate said casters in unison, and further including means for limiting the swivel range of said casters when said disconnects connect said steering control to said casters, and which allows said casters to rotate 360° when said disconnects disconnect said steering control from said casters.

19. The vehicle of claim 11, further including a pedal mechanism on said vehicle for enabling said occupant to propel said vehicle.

20. A method for controlling a vehicle of the type having at least one caster so that said vehicle can be steered by a occupant thereon or by an external force, comprising:

providing a vehicle frame or body for carrying an occupant thereon, said vehicle having at least one wheel mounted on said vehicle frame or body for enabling said vehicle to be rolled over a surface, providing at least one swivelable caster containing a rotatable wheel and mounted on said vehicle, said caster being able to swivel so that said vehicle can be rolled in any direction, providing a steering control on said vehicle, said steering control positioned so that it can be operated by said occupant on said vehicle, said steering control coupled to said caster so that manipulation of said steering control will swivel said caster, disconnecting said steering control from said caster so that said caster will be able to swivel freely so as to be able to steer said vehicle externally when said steering control is disconnected, and connecting said steering control to said caster so that said occupant will be able to turn said steering control and thereby swivel said caster and steer said vehicle when said steering control is connected to said caster, whereby said vehicle can be quickly and easily converted back and forth between externally steered and steered by said occupant, yet said vehicle will have directional stability, can be used on rough surfaces, and can be rapidly propelled.

21. The method of claim 20 wherein (a) said caster comprises a fork, a pintle, and a pintle housing in which said pintle can swivel, (b) said steering control comprises a steering arm coupled to said caster, and (c) said disconnecting comprises providing an axially moveable pin which is spring urged in one direction and which extends through a portion of said steering arm to a recess in one of said pintle and said fork, so that insertion of said pin into one of said recesses will enable said steering control to swivel said pintle.

22. The method of claim 20 wherein said steering control comprises a rotatable member, a shaft extending down from said rotatable member, and a steering arm coupling said shaft to said caster so that rotation of said steering control will rotate said caster, and further including providing means for limiting the swivel range of said caster when said disconnect connects said steering control to said caster, and for allowing said caster to rotate 360° when said disconnect disconnects said steering control from said caster.

23. The vehicle of claim 11 wherein said vehicle is selected from the class consisting of strollers, children's vehicles, wheelchairs, scooters, and carts.

* * * * *